US012683412B2

(12) United States Patent
Kahn et al.

(10) Patent No.: US 12,683,412 B2
(45) Date of Patent: *Jul. 14, 2026

(54) CONTROLLERS FOR MANAGING A PLURALITY OF STACKS OF ELECTROCHEMICAL CELLS, AND ASSOCIATED METHODS

(71) Applicant: Element Energy, Inc., Menlo Park, CA (US)

(72) Inventors: Seth Marshall Kahn, Sonoma, CA (US); Corrado Cammi, Mountain View, CA (US); Anthony John Stratakos, Edgartown, MA (US); Rainer Johannes Fasching, Mill Valley, CA (US)

(73) Assignee: Element Energy, Inc., Menlo Park, CA (US)

( * ) Notice: Subject to any disclaimer, the term of this patent is extended or adjusted under 35 U.S.C. 154(b) by 827 days.

This patent is subject to a terminal disclaimer.

(21) Appl. No.: 18/166,916

(22) Filed: Feb. 9, 2023

(65) Prior Publication Data

US 2023/0253803 A1     Aug. 10, 2023

Related U.S. Application Data

(63) Continuation-in-part of application No. 17/650,472, filed on Feb. 9, 2022, now Pat. No. 11,699,909.

(51) Int. Cl.
*H02J 7/50* (2026.01)
*H02J 7/00* (2006.01)
(Continued)

(52) U.S. Cl.
CPC ..................................... *H02J 7/50* (2026.01); *H02J 7/82* (2026.01); *H02J 7/855* (2026.01); *H02J 7/933* (2026.01)

(58) Field of Classification Search
CPC ....................................................... H02J 7/50
(Continued)

(56) References Cited

U.S. PATENT DOCUMENTS 6,160,441 A     12/2000  Stratakos et al.
6,262,558 B1     7/2001  Weinberg
(Continued)

FOREIGN PATENT DOCUMENTS

CA          2667825 A1     5/2008
EP          0762591 A2     3/1997
(Continued)

OTHER PUBLICATIONS

U.S. Appl. No. 18/660,115, filed May 9, 2024, 102 pages.
(Continued)

*Primary Examiner* — Jerry D Robbins
(74) *Attorney, Agent, or Firm* — PdZ Patent Law, PLLC

(57) ABSTRACT

A method for managing a plurality of stacks of electrochemical cells, where the plurality of stacks are electrically coupled in parallel in a battery. The method includes (a) operating the plurality of stacks to execute a global operating strategy of the battery, (b) changing respective operating points of one or more first stacks of the plurality of stacks to execute a local operating strategy, (c) changing respective operating points of one or more second stacks of the plurality of stacks to maintain the global operating strategy of the battery while executing the local operating strategy, and (d) after completing execution of the local operating strategy, further changing the respective operating points of the one or more first stacks to compensate for change in the state of charge of the one or more first stacks caused by executing the local operating strategy.

20 Claims, 17 Drawing Sheets

(51) Int. Cl.
*H02J 7/82* (2026.01)
*H02J 7/90* (2026.01)

(58) Field of Classification Search
USPC ........................................................ 320/126
See application file for complete search history.

(56) References Cited

U.S. PATENT DOCUMENTS

| | | | |
|---|---|---|---|
| 6,445,244 | B1 | 9/2002 | Stratakos et al. |
| 6,777,953 | B2 | 8/2004 | Blades |
| 6,835,491 | B2 | 12/2004 | Gartstein et al. |
| 6,876,203 | B2 | 4/2005 | Blades |
| 6,984,970 | B2 | 1/2006 | Capel |
| 7,068,017 | B2 | 6/2006 | Willner et al. |
| 7,391,218 | B2 | 6/2008 | Kojori et al. |
| 8,158,877 | B2 | 4/2012 | Klein et al. |
| 8,395,519 | B2 | 3/2013 | Cassidy |
| 8,503,137 | B2 | 8/2013 | Panetta |
| 8,643,216 | B2 | 2/2014 | Lattin |
| 8,686,693 | B2 | 4/2014 | Bhowmik et al. |
| 8,810,199 | B2 | 8/2014 | Roeper |
| 8,817,431 | B2 | 8/2014 | Tomimbang et al. |
| 8,837,097 | B2 | 9/2014 | Zuercher et al. |
| 8,879,218 | B2 | 11/2014 | Tomimbang |
| 9,132,734 | B2 | 9/2015 | Auguet et al. |
| 9,172,120 | B2 | 10/2015 | Pariseau et al. |
| 9,257,729 | B2 | 2/2016 | Hermann et al. |
| 9,312,769 | B2 | 4/2016 | Stratakos et al. |
| 9,331,497 | B2 | 5/2016 | Beaston |
| 9,425,631 | B2 | 8/2016 | Furtner |
| 9,515,496 | B1 | 12/2016 | Ying |
| 9,564,762 | B2 | 2/2017 | Lee et al. |
| 9,705,341 | B2 | 7/2017 | Komatsu et al. |
| 9,806,545 | B2 | 10/2017 | Fink |
| 9,865,901 | B2 | 1/2018 | Hwang |
| 9,893,385 | B1 * | 2/2018 | Nayar .................. H01M 10/425 |
| 9,965,007 | B2 | 5/2018 | Amelio et al. |
| 10,018,682 | B2 | 7/2018 | Kaupp et al. |
| 10,153,651 | B2 | 12/2018 | Taylor et al. |
| 10,270,262 | B2 | 4/2019 | Kim et al. |
| 10,553,851 | B2 | 2/2020 | Kim |
| 10,714,974 | B2 | 7/2020 | Clifton et al. |
| 10,727,545 | B1 * | 7/2020 | Gan ........................ H01M 10/44 |
| 10,777,851 | B2 | 9/2020 | Razzell |
| 10,804,690 | B2 | 10/2020 | Ronne et al. |
| 10,928,461 | B1 | 2/2021 | Stafl |
| 10,992,149 | B1 | 4/2021 | Kahn et al. |
| 11,043,821 | B2 | 6/2021 | Nishikawa et al. |
| 11,061,076 | B1 * | 7/2021 | Fasching .......... G01R 19/16542 |
| 11,258,279 | B1 | 2/2022 | Kahn et al. |
| 2005/0121067 | A1 | 6/2005 | Toyomura et al. |
| 2005/0139258 | A1 | 6/2005 | Liu et al. |
| 2005/0151513 | A1 | 7/2005 | Cook et al. |
| 2007/0223165 | A1 | 9/2007 | Itri et al. |
| 2008/0236648 | A1 | 10/2008 | Klein et al. |
| 2008/0303503 | A1 | 12/2008 | Wolfs |
| 2009/0284078 | A1 | 11/2009 | Zhang et al. |
| 2009/0284232 | A1 | 11/2009 | Zhang et al. |
| 2009/0284240 | A1 | 11/2009 | Zhang et al. |
| 2009/0284998 | A1 | 11/2009 | Zhang et al. |
| 2010/0207455 | A1 | 8/2010 | Erickson, Jr. et al. |
| 2010/0253150 | A1 | 10/2010 | Porter et al. |
| 2010/0288327 | A1 | 11/2010 | Lisi et al. |
| 2010/0327659 | A1 | 12/2010 | Lisi et al. |
| 2011/0062784 | A1 | 3/2011 | Wolfs |
| 2011/0090607 | A1 | 4/2011 | Luebke et al. |
| 2011/0141644 | A1 | 6/2011 | Hastings et al. |
| 2011/0301772 | A1 | 12/2011 | Zuercher et al. |
| 2012/0013201 | A1 | 1/2012 | Pariseau et al. |
| 2012/0043818 | A1 | 2/2012 | Stratakos et al. |

| | | | |
|---|---|---|---|
| 2012/0043823 | A1 | 2/2012 | Stratakos et al. |
| 2012/0043923 | A1 | 2/2012 | Ikriannikov et al. |
| 2012/0044014 | A1 | 2/2012 | Stratakos et al. |
| 2012/0089266 | A1 | 4/2012 | Tomimbang et al. |
| 2012/0112760 | A1 | 5/2012 | Yoscovich et al. |
| 2012/0119746 | A1 | 5/2012 | Macris |
| 2012/0133521 | A1 | 5/2012 | Rothkppf et al. |
| 2012/0313560 | A1 | 12/2012 | Hambitzer et al. |
| 2013/0092208 | A1 | 4/2013 | Robbins |
| 2013/0106194 | A1 | 5/2013 | Jergovic et al. |
| 2013/0154567 | A1 | 6/2013 | Peterson et al. |
| 2013/0170084 | A1 | 7/2013 | Strobl et al. |
| 2013/0176401 | A1 | 7/2013 | Monari et al. |
| 2013/0234669 | A1 | 9/2013 | Huang et al. |
| 2013/0257323 | A1 * | 10/2013 | Diamond .................. B60L 3/12 |
| | | | 320/118 |
| 2014/0253045 | A1 | 9/2014 | Poznar |
| 2014/0368205 | A1 | 12/2014 | Svensson et al. |
| 2014/0373894 | A1 | 12/2014 | Stratakos et al. |
| 2015/0115736 | A1 | 4/2015 | Snyder |
| 2015/0171628 | A1 | 6/2015 | Ponec et al. |
| 2015/0377976 | A1 * | 12/2015 | Maluf .................. G01R 31/392 |
| | | | 702/63 |
| 2016/0261127 | A1 | 9/2016 | Worry et al. |
| 2016/0372940 | A1 | 12/2016 | Canadi |
| 2017/0123008 | A1 | 5/2017 | Frias et al. |
| 2018/0147947 | A1 | 5/2018 | Gebhart |
| 2018/0241097 | A1 * | 8/2018 | Yamasaki .......... H01M 10/441 |
| 2018/0252195 | A1 | 9/2018 | Ciaccio et al. |
| 2019/0198938 | A1 | 6/2019 | Fujita et al. |
| 2019/0212383 | A1 | 7/2019 | Elliott |
| 2019/0361075 | A1 | 11/2019 | Lee et al. |
| 2020/0021107 | A1 | 1/2020 | Collins et al. |
| 2020/0127489 | A1 | 4/2020 | Chen et al. |
| 2020/0161875 | A1 * | 5/2020 | Nishikawa ................ H02J 7/62 |
| 2020/0207219 | A1 | 7/2020 | Slepchenkov et al. |
| 2020/0212959 | A1 | 7/2020 | Eriksen et al. |
| 2020/0254882 | A1 | 8/2020 | Kwon et al. |
| 2020/0350779 | A1 | 11/2020 | Tikhonski et al. |
| 2021/0044119 | A1 * | 2/2021 | Poland ................. G01R 31/392 |
| 2021/0096398 | A1 | 4/2021 | Hekmat et al. |
| 2021/0119455 | A1 | 4/2021 | Jaipaul et al. |
| 2022/0115879 | A1 | 4/2022 | Kahn et al. |
| 2023/0011716 | A1 | 1/2023 | Kahn et al. |

FOREIGN PATENT DOCUMENTS

| | | | |
|---|---|---|---|
| EP | 3550581 | A1 | 10/2019 |
| EP | 35999653 | A1 | 1/2020 |
| WO | 2013053445 | A1 | 4/2013 |
| WO | 2015200366 | A1 | 12/2015 |

OTHER PUBLICATIONS

Walker, Geoffrey R., et al., "Cascaded DC-DC Converter Connection of Photovoltaic Modules", IEEE Transactions on Power Electronics, vol. 19, No. 4, (Jul. 2004), 1130-1139.

Wolfs, Peter, et al., "Distributed Maximum Power Tracking for High Performance Vehicle Solar Arrays", Australian Universities Power Engineering Conference (AUPEC 2004), (Sep. 2004), 6 pgs.

Machine translation of Description of WO 2012/053445, 11 pages.

Martinez et al., Arc Fault Management by Solid State Switches for Enhanced Automotive Safety, Jan. 2005, IEEE, pp. 1029-1034, 2005.

Machine translation of CN 109860740, 24 pages.

U.S. Appl. No. 17/821,179, Application as Filed on Aug. 21, 2022, 124 pages.

U.S. Appl. No. 17/650,472, Application as Filed on Feb. 9, 2022, 82 pages.

Machine Translation of CN 10924380, 15 pages.

* cited by examiner

700

800

1100

1200

100%

$SOC_T$

0

Time(sec)

$t_{g1}$ $t_{g2}$ $t_{g3}$ $t_{g4}$ $t_{g5}$

2000

CONTROLLERS FOR MANAGING A PLURALITY OF STACKS OF ELECTROCHEMICAL CELLS, AND ASSOCIATED METHODS

RELATED APPLICATIONS

This application is a continuation-in-part of U.S. patent application Ser. No. 17/650,472, filed on Feb. 9, 2022, which is incorporated herein by reference.

BACKGROUND

A battery is a device including one or more electrochemical cells that may be discharged to convert chemical energy into electrical energy. Batteries may be grouped into primary batteries and secondary batteries. A primary battery is single-use device which undergoes an irreversible change during its discharge. A secondary battery, in contrast, can be recharged by applying an electric current to the battery, and a secondary battery can therefore be discharged and recharged multiple times. Large batteries often include two or more stacks of electrochemical cells electrically coupled in parallel, where each stack may include tens, hundreds, or even thousands, of electrochemical cells.

Batteries are widely used as electrical power sources in applications where a continuous connection to a fixed electric power source, such as an electric utility grid, is undesirable or infeasible. For example, batteries are widely used to power mobile information technology devices, such as mobile telephones and tablet computers. Additionally, batteries are increasingly being used as a power source in vehicles, either as a vehicle's sole power source or to supplement a vehicle's internal combustion engine. It is anticipated that batteries will largely supplant internal combustion engines in future new vehicles.

Furthermore, there is great interest in using batteries in electrical infrastructure to store energy. For example, an electric utility may charge a battery to store energy when there is a surplus of electrical power, and the electric utility may subsequently discharge the battery to withdraw the stored energy when additional electrical power is needed. Accordingly, batteries are anticipated to be a key component in the ongoing transition from fossil fuel electrical power sources to renewable electric power sources, as batteries can compensate for the intermittent nature of renewable electric power sources.

One popular battery is the Lithium-ion (Li-ion) battery. Examples of Li-ion batteries include Lithium Cobalt Oxide (LCO) batteries, Lithium Manganese Oxide (LMO) batteries, Lithium Nickel Manganese Cobalt Oxide (NMC) batteries, Lithium Iron Phosphate (LFP) batteries, Lithium Nickel Cobalt Aluminum Oxide (NCA) batteries, and Lithium Titanate (LTO) batteries. Li-ion batteries advantageously have a high energy density relative to most other secondary batteries. However, Li-ion batteries can easily be damaged by operation outside of their intended operating range, such as by overcharging the battery or by excessively discharging the battery. Additionally, the high energy density of Li-ion batteries makes them susceptible to catching fire or exploding in case of battery damage or battery failure. Battery management systems, which control battery operation, such as battery charging and discharging, are therefore used with Li-ion batteries (and other batteries) to help achieve long battery life and safe battery operation.

SUMMARY

In a first aspect, a method for managing a plurality of stacks of electrochemical cells electrically coupled in parallel in a battery includes (a) operating the plurality of stacks to execute a global operating strategy of the battery, (b) changing respective operating points of one or more first stacks of the plurality of stacks to execute a local operating strategy, and (c) changing respective operating points of one or more second stacks of the plurality of stacks to maintain the global operating strategy of the battery while executing the local operating strategy.

In an embodiment of the first aspect, the global operating strategy includes at least one of (a) providing substantially constant power to a load, (b) providing substantially constant current to a load, and (c) providing substantially constant voltage to a load.

In another embodiment of the first aspect, the global operating strategy includes operating the battery in a standby mode.

In another embodiment of the first aspect, the global operating strategy includes receiving at least one of (a) a substantially constant power from an electric power source for charging the electrochemical cells of the plurality of stacks, (b) a substantially constant voltage from an electric power source for charging the electrochemical cells of the plurality of stacks, and (c) a substantially constant current from an electric power source for charging the electrochemical cells of the plurality of stacks.

Another embodiment of the first aspect further includes executing the local operating strategy to reduce variations in state of charge among the plurality of stacks.

Another embodiment of the first aspect further includes executing the local operating strategy in response to variations in capacity among the plurality of stacks.

Another embodiment of the first aspect further includes executing the local operating strategy to cause each stack of the plurality of stacks to reach a predetermined minimum state of charge, or a predetermined minimum voltage, at a substantially common time.

Another embodiment of the first aspect further includes executing the local operating strategy to cause each stack of the plurality of stacks to reach a predetermined maximum state of charge, or a predetermined maximum voltage, at a substantially common time.

Another embodiment of the first aspect further includes executing the local operating strategy in response to a state of degradation of one or more of the plurality of stacks crossing a threshold value.

Another embodiment of the first aspect further includes executing the local operating strategy in response to state of safety of one or more of the plurality of stacks crossing a threshold value.

Another embodiment of the first aspect further includes executing the local operating strategy as part of a diagnostic test for one or more of the plurality of stacks.

In another embodiment of the first aspect, the local operating strategy includes operating the one or more first stacks in an open circuit mode.

In another embodiment of the first aspect, the local operating strategy includes operating the one or more first stacks in at least one of (a) a constant power mode, (b) a constant current mode, and (c) a constant voltage mode.

In another embodiment of the first aspect, the local operating strategy includes operating the one or more first stacks at a different power level, or at a different current level, than the one or more second stacks.

In another embodiment of the first aspect, the local operating strategy includes repeatedly changing respective operating points of the one or more first stacks.

In another embodiment of the first aspect, the local operating strategy includes causing the one or more first stacks to move toward a different state of charge than the one or more second stacks.

Another embodiment of the first aspect further includes causing the one or more second stacks to act as a load for the one or more first stacks.

Another embodiment of the first aspect further includes causing the one or more second stacks to act as a power source for the one or more first stacks.

In another embodiment of the first aspect, (a) changing the respective operating points of the one or more first stacks to execute the local operating strategy includes controlling one or more respective power converters electrically coupling each first stack to one or more power buses of the battery, and (b) changing the respective operating points of the one or more second stacks to maintain the global operating strategy of the battery comprises controlling one or more respective power converters electrically coupling each second stack to the one or more power buses of the battery.

In another embodiment of the first aspect, (1) changing the respective operating points of the one or more first stacks to execute the local operating strategy includes at least one of (a) connecting at least one of the one or more first stacks to a power bus of the battery and (b) disconnecting at least one of the one or more first stacks from the power bus of the battery, and (2) changing the respective operating points of the one or more second stacks to maintain the global operating strategy of the battery includes at least one of (a) connecting at least one of the one or more second stacks to the power bus of the battery and (b) disconnecting at least one of the one or more second stacks from the power bus of the battery.

In another embodiment of the first aspect, each stack of the plurality of stacks includes a respective string of a plurality of electrochemical cells electrically coupled in series.

In a second aspect, a method for managing a plurality of stacks of electrochemical cells electrically coupled in parallel in a battery includes (a) operating the plurality of stacks to execute a global operating strategy of the battery, (b) changing respective operating points of one or more first stacks of the plurality of stacks to execute a local operating strategy during a first time period, and (c) changing respective operating points of one or more second stacks of the plurality of stacks to maintain the global operating strategy of the battery during the first time period.

In an embodiment of the second aspect, (a) changing the respective operating points of the one or more second stacks to maintain the global operating strategy of the battery during the first time period includes changing the respective operating points of the one or more second stacks from respective initial operating points to respective modified operating points, and (b) the method further includes changing the respective operating points of the one or more second stacks from the respective modified operating points to the respective initial operating points after the first time period, to maintain the global operating strategy of the battery after the first time period.

In another embodiment of the second aspect, (a) changing the respective operating points of the one or more first stacks of the plurality of stacks to execute the local operating strategy during the first time period includes changing the respective operating points of the one or more first stacks from respective initial operating points to respective modified operating points, and (b) the method further includes changing the respective operating points of the one or more first stacks from the respective modified operating points to the respective initial operating points after the first time period, to maintain the global operating strategy of the battery after the first time period.

In another embodiment of the second aspect, the global operating strategy includes at least one of (a) providing a substantially constant power to a load, (b) providing a substantially constant current to a load, and (c) providing a substantially constant voltage to a load.

In another embodiment of the second aspect, the global operating strategy includes operating the battery in a standby mode.

In another embodiment of the second aspect, the global operating strategy includes receiving at least one of constant power and constant current from an electric power source for charging the electrochemical cells of the plurality of stacks.

Another embodiment of the second aspect further includes executing the local operating strategy to reduce variations in state of charge among the plurality of stacks.

Another embodiment of the second aspect further includes executing the local operating strategy in response to variations in capacity among the plurality of stacks.

Another embodiment of the second aspect further includes executing the local operating strategy to cause each stack of the plurality of stacks to reach a predetermined minimum state of charge, or a predetermined minimum voltage, at a substantially common time.

Another embodiment of the second aspect further includes executing the local operating strategy to cause each stack of the plurality of stacks to reach a predetermined maximum state of charge, or a predetermined maximum voltage, at a substantially common time.

Another embodiment of the second aspect further includes executing the local operating strategy in response to a state of degradation of one or more of the plurality of stacks crossing a threshold value.

Another embodiment of the second aspect further includes executing the local operating strategy in response to state of safety of one or more of the plurality of stacks crossing a threshold value.

Another embodiment of the second aspect further includes executing the local operating strategy as part of a diagnostic test for one or more of the plurality of stacks.

In another embodiment of the second aspect, the local operating strategy includes operating the one or more first stacks in an open circuit mode.

In another embodiment of the second aspect, the local operating strategy includes operating the one or more first stacks in at least one of (a) a constant power mode, (b) a constant current mode, and (c) a constant voltage mode.

In another embodiment of the second aspect, the local operating strategy includes operating the one or more first stacks at a different power level than the one or more second stacks.

In another embodiment of the second aspect, the local operating strategy includes repeatedly changing respective operating points of the one or more first stacks.

In another embodiment of the second aspect, the local operating strategy includes causing the one or more first stacks to move toward a different state of charge than the one or more second stacks.

Another embodiment of the second aspect further includes causing the one or more second stacks to act as a load for the one or more first stacks.

Another embodiment of the second aspect further comprising causing the one or more second stacks to act as a power source for the one or more first stacks.

In another embodiment of the second aspect, (a) changing the respective operating points of the one or more first stacks to execute the local operating strategy includes controlling a respective one or more power converters electrically coupling each first stack to one or more power buses of the battery, and (b) changing the respective operating points of the one or more second stacks to maintain the global operating strategy of the battery includes controlling one or more respective power converters electrically coupling each second stack to the one or more power buses of the battery.

In another embodiment of the second aspect, each stack of the plurality of stacks includes a respective string of a plurality of electrochemical cells electrically coupled in series.

In a third aspect, a method for managing a plurality of stacks of electrochemical cells electrically coupled in parallel in a battery includes (a) changing an operating point of a first stack of the plurality of stacks to execute a first local operating strategy and (b) changing an operating point of a second stack of the plurality of stacks to at least partially compensate for changing the operating point of the first stack to execute the first local operating strategy.

In an embodiment of the third aspect, changing the operating point of the second stack to at least partially compensate for changing the operating point of the first stack includes changing the operating point of the second stack to at least partially prevent change in a global operating point of the battery resulting from changing the operating point of the first stack.

Another embodiment of the third aspect further includes leaving an operating point of a third stack of the plurality of stacks unchanged while changing the operating point of the first stack to execute the first local operating strategy.

Another embodiment of the third aspect further includes changing an operating point of a third stack of the plurality of stacks to further compensate for changing the operating point of the first stack to execute the first local operating strategy.

Another embodiment of the third aspect further includes changing an operating point of a third stack of the plurality of stacks according to a second local operating strategy.

Another embodiment of the third aspect further includes changing the operating point of the second stack to at least partially compensate for changing the operating point of the third stack according to the second local operating strategy.

Another embodiment of the third aspect further includes (a) changing the operating point of the second stack according to a second local operating strategy and (b) changing the operating point of the first stack to at least partially compensate for changing the operating point of the second stack according to the second local operating strategy.

In another embodiment of the third aspect, changing the operating point of the first stack comprises changing one of (a) a magnitude of current flowing between the first stack and a power bus of the battery and (b) magnitude of power transferred between the first stack and the power bus of the battery.

In a fourth aspect, a method for managing a plurality of stacks of electrochemical cells electrically coupled in parallel in a battery includes (a) operating the plurality of stacks to execute a global operating strategy of the battery, (b) changing respective operating points of one or more first stacks of the plurality of stacks to execute a local operating strategy, (c) changing respective operating points of one or more second stacks of the plurality of stacks to maintain the global operating strategy of the battery while executing the local operating strategy, and (d) after completing execution of the local operating strategy, further changing the respective operating points of the one or more first stacks to compensate for change in the state of charge of the one or more first stacks caused by executing the local operating strategy.

In an embodiment of the fourth aspect, the global operating strategy includes at least one of (a) providing substantially constant power to a load, (b) providing substantially constant current to a load, and (c) providing substantially constant voltage to a load.

In another embodiment of the fourth aspect, the global operating strategy includes operating the battery in a standby mode.

In another embodiment of the fourth aspect, the global operating strategy includes receiving at least one of (a) a substantially constant power from an electric power source for charging the electrochemical cells of the plurality of stacks, (b) a substantially constant voltage from an electric power source for charging the electrochemical cells of the plurality of stacks, and (c) a substantially constant current from an electric power source for charging the electrochemical cells of the plurality of stacks.

In another embodiment of the fourth aspect, the method further includes executing the local operating strategy as part of a diagnostic test for one or more of the plurality of stacks.

In another embodiment of the fourth aspect, the local operating strategy includes operating the one or more first stacks in at least one of (a) a constant power mode, (b) a constant current mode, (c) a constant voltage mode, and (d) an open circuit mode.

In another embodiment of the fourth aspect, the local operating strategy includes operating the one or more first stacks at a different power level, or at a different current level, than the one or more second stacks.

In another embodiment of the fourth aspect, the local operating strategy includes repeatedly changing respective operating points of the one or more first stacks.

In another embodiment of the fourth aspect, the local operating strategy includes causing the one or more first stacks to move toward a different state of charge than the one or more second stacks.

In a fifth aspect, a method for managing a plurality of stacks of electrochemical cells electrically coupled in parallel in a battery includes (a) operating the plurality of stacks to execute a global operating strategy of the battery, the global operating strategy including a plurality of components, (b) changing respective operating points of one or more first stacks of the plurality of stacks to execute a local operating strategy, and (c) changing respective operating points of one or more second stacks of the plurality of stacks to maintain the global operating strategy of the battery while executing the local operating strategy.

In an embodiment of the fifth aspect, the plurality of components of the global operating strategy include (1) a first component selected from the group consisting of (a) providing constant power from the battery to a load, (b) providing constant current from the battery to a load, (c) providing constant voltage from the battery to a load, (d) receiving constant power at the battery from an electric power source, (e) receiving constant voltage at the battery from an electric power source, (f) receiving constant current at the battery from an electric power source, (g) operating the battery in a standby mode where the battery neither provides power to a load nor receives power from an electric power source, (h) stabilizing voltage of an alternating current (AC) electric power grid, and (i) stabilizing frequency of an AC electric power grid; and (2) a second component selected from the group consisting of (a) maintaining a constant overall rate of charge of the battery, (b) maintaining a constant overall rate of discharge of the battery, (c) maintaining the plurality of stacks at a common state of charge as the stacks charge, and (d) maintaining the plurality of stacks at a common state of charge as the stacks discharge.

In another embodiment of the fifth aspect, the method further includes executing the local operating strategy to cause each stack of the plurality of stacks to reach a predetermined minimum state of charge, or a predetermined minimum voltage, at a substantially common time.

In another embodiment of the fifth aspect, the method further includes executing the local operating strategy to cause each stack of the plurality of stacks to reach a predetermined maximum state of charge, or a predetermined maximum voltage, at a substantially common time.

In another embodiment of the fifth aspect, the method further includes executing the local operating strategy as part of a diagnostic test for one or more of the plurality of stacks.

In another embodiment of the fifth aspect, the local operating strategy includes operating the one or more first stacks at a different power level, or at a different current level, than the one or more second stacks.

In another embodiment of the fifth aspect, the local operating strategy includes repeatedly changing respective operating points of the one or more first stacks.

In another embodiment of the fifth aspect, the local operating strategy includes causing the one or more first stacks to move toward a different state of charge than the one or more second stacks.

In a sixth aspect, a method for managing a plurality of stacks of electrochemical cells electrically coupled in parallel in a battery includes (a) operating the plurality of stacks to execute a global operating strategy of the battery, (b) changing respective operating points of one or more first stacks of the plurality of stacks to execute a local operating strategy with respect to one or more second stacks of the plurality of stacks, and (c) changing respective operating points of one or more third stacks of the plurality of stacks to maintain the global operating strategy of the battery while executing the local operating strategy.

In an embodiment of the sixth aspect, the method further includes executing the local operating strategy to cause each stack of the plurality of stacks to reach a predetermined minimum state of charge, or a predetermined minimum voltage, at a substantially common time.

In another embodiment of the sixth aspect, the method further includes executing the local operating strategy to cause each stack of the plurality of stacks to reach a predetermined maximum state of charge, or a predetermined maximum voltage, at a substantially common time.

In a seventh aspect, a method for managing a plurality of stacks of electrochemical cells electrically coupled in parallel in a battery includes (1) operating the plurality of stacks to execute a global operating strategy of the battery, (2) controlling one or more first power converters to change operation of one or more first stacks of the plurality of stacks to execute a first local operating strategy for determining one or more of (a) open circuit voltage of the one or more first stacks and (b) leakage current of the one or more first stacks, and (3) controlling one or more second power converters to change operation of one or more second stacks of the plurality of stacks to compensate for change in operation of the one or more first stacks caused by executing the first local operating strategy for determining one or more of (a) open circuit voltage of the one or more first stacks and (b) leakage current of the one or more first stacks, and thereby maintain the global operating strategy of the battery while executing the first local operating strategy.

In an embodiment of the seventh aspect, the global operating strategy includes at least one of (a) providing substantially constant power to a load, (b) providing substantially constant current to a load, and (c) providing substantially constant voltage to a load.

In another embodiment of the seventh aspect, the global operating strategy includes receiving at least one of (a) a substantially constant power from an electric power source for charging the electrochemical cells of the plurality of stacks, (b) a substantially constant voltage from an electric power source for charging the electrochemical cells of the plurality of stacks, and (c) a substantially constant current from an electric power source for charging the electrochemical cells of the plurality of stacks.

In another embodiment of the seventh aspect, the method further includes, after executing the first local operating strategy, controlling the one or more first power converters to change operation of the one or more first stacks to execute a second local operating strategy to cause each stack of the plurality of stacks to reach a predetermined minimum state of charge, or a predetermined minimum voltage, at a substantially common time.

In another embodiment of the seventh aspect, the method further includes, after executing the first local operating strategy, controlling the one or more first power converters to change operation of the one or more first stacks to execute a second local operating strategy to cause each stack of the plurality of stacks to reach a predetermined maximum state of charge, or a predetermined maximum voltage, at a substantially common time.

In another embodiment of the seventh aspect, the method further includes executing the first local operating strategy as part of a diagnostic test for one or more of the plurality of stacks.

In another embodiment of the seventh aspect, the first local operating strategy includes operating the one or more first stacks in an open circuit mode.

In another embodiment of the seventh aspect, the method further includes after executing the first local operating strategy, executing a second local operating strategy of operating the one or more first stacks in at least one of (a) a constant power mode, (b) a constant current mode, and (c) a constant voltage mode.

In another embodiment of the seventh aspect, the method further includes after executing the first local operating strategy, executing a second local operating strategy of operating the one or more first stacks at a different power level, or at a different current level, than the one or more second stacks.

In another embodiment of the seventh aspect, the method further includes after executing the first local operating strategy, controlling the one or more first power converters to execute a second local operating strategy of repeatedly changing operation of the one or more first stacks.

In another embodiment of the seventh aspect, controlling the one or more first power converters to change operation of the one or more first stacks of the plurality of stacks to execute the first local operating strategy includes intermittently operating the one or more first stacks in an open circuit mode.

In an eighth aspect, a method for managing a plurality of stacks of electrochemical cells electrically coupled in parallel in a battery includes (a) operating the plurality of stacks to execute a global operating strategy of the battery, (b) controlling one or more first power converters to change operation of one or more first stacks of the plurality of stacks to execute a local operating strategy of causing the one or more first stacks to move toward a different state of charge than one or more second stacks of the plurality of stacks, to perform state of charge recalibration of the one or more first stacks, and (c) controlling one or more second power converters to change operation of the one or more second stacks to compensate for change in operation of the one or more first stacks caused by executing the local operating strategy of causing the one or more first stacks to move toward the different state of charge than one or more second stacks of the plurality of stacks, and thereby maintain the global operating strategy of the battery while executing the local operating strategy.

In an embodiment of the eighth aspect, causing the one or more first stacks to move toward the different state of charge than the one or more second stacks includes causing the one or more first stacks to move out of an operating region where stack voltage is insensitive to change in stack state of charge.

In another embodiment of the eighth aspect, the method further includes after executing the local operating strategy, controlling the one or more first power converters to change operation of the one or more first stacks and the one or more second stacks to cause state of charge of the one or more first stacks and state of charge of the one or more second stacks to converge toward a common value.

In a ninth aspect, a method for managing a plurality of stacks of electrochemical cells electrically coupled in parallel in a battery includes (a) operating the plurality of stacks to execute a global operating strategy of the battery, (b) controlling one or more first power converters to change operation of one or more first stacks of the plurality of stacks to execute a local operating strategy for reducing degradation of the one or more first stacks, and (c) controlling one or more second power converters to change operation of one or more second stacks of the plurality of stacks to compensate for change in operation of the one or more first stacks caused by executing the local operating strategy for reducing degradation of the one or more first stacks, and thereby maintain the global operating strategy of the battery while executing the local operating strategy.

In an embodiment of the ninth aspect, the global operating strategy includes operating the battery in a standby mode.

In another embodiment of the ninth aspect, executing the local operating strategy for reducing degradation of the one or more first stacks includes changing a discharge rate of the one or more first stacks during a critical state of charge range of the one or more first stacks.

In another embodiment of the ninth aspect, the method further includes after executing the local operating strategy, (a) controlling the one or more first power converters to change operation of the one or more first stacks and (b) controlling the one or more second power converters to change operation of the one or more second stacks, to cause state of charge of the one or more first stacks and state of charge of the one or more second stacks to converge toward a common value.

In a tenth aspect, a method for managing a plurality of stacks of electrochemical cells electrically coupled in parallel in a battery includes (a) operating the plurality of stacks to execute a global operating strategy of the battery, (b) controlling one or more first power converters to change operation of one or more first stacks of the plurality of stacks to execute a local operating strategy in response to a state of safety of the one or more first stacks crossing a threshold value, and (c) controlling one or more second power converters to change operation of one or more second stacks of the plurality of stacks to compensate for change in operation of the one or more first stacks caused by executing the local operating strategy in response to the state of safety of the one or more first stacks crossing the threshold value, and thereby maintain the global operating strategy of the battery while executing the local operating strategy.

In an embodiment of the tenth aspect, the local operating strategy includes limiting one of (a) maximum state of charge of the one or more first stacks and (b) minimum state of charge of the one or more first stacks.

In another embodiment of the tenth aspect, the local operating strategy includes limiting magnitude of current through the one or more first stacks.

DETAILED DESCRIPTION OF THE EMBODIMENTS

As discussed above, large batteries often include two or more stacks of electrochemical cells, henceforth referred to as "stacks" for brevity, electrically coupled in parallel. Such parallel electrical coupling of stacks is used, for example, to obtain a higher current capability and/or energy storage capacity than can be obtained from a single stack. Multiple stacks may be directly connected in parallel within a battery, although this configuration does not permit individual control of stacks. Alternately, multiple stacks may be electrically coupled in parallel within a battery via one or more power converters, and this configuration enables individual control of stacks or individual control of groups of stacks.

Disclosed herein are controllers and methods for managing a plurality of stacks of electrochemical cells, where the stacks are electrically coupled in parallel within a battery. These new controllers and methods significantly advance the state of the art of battery management. For example, certain embodiments enable a battery to execute a local operating strategy for a portion of the battery while simultaneously executing a global operating strategy for the entire battery. Such ability to simultaneously execute local and global operating strategies may achieve significant advantages. For example, in some embodiments, a diagnostic test may be performed on one or more of stacks of a battery, maintenance may be performed on one or more stacks of the battery, a corrective action may be performed on one or more stacks of the battery, a safety action may be performed on one or more stacks of the battery, and/or an optimization action may be performed on one or more stacks of the battery, without interfering with global operation of the battery, as discussed below.

Figure 1:
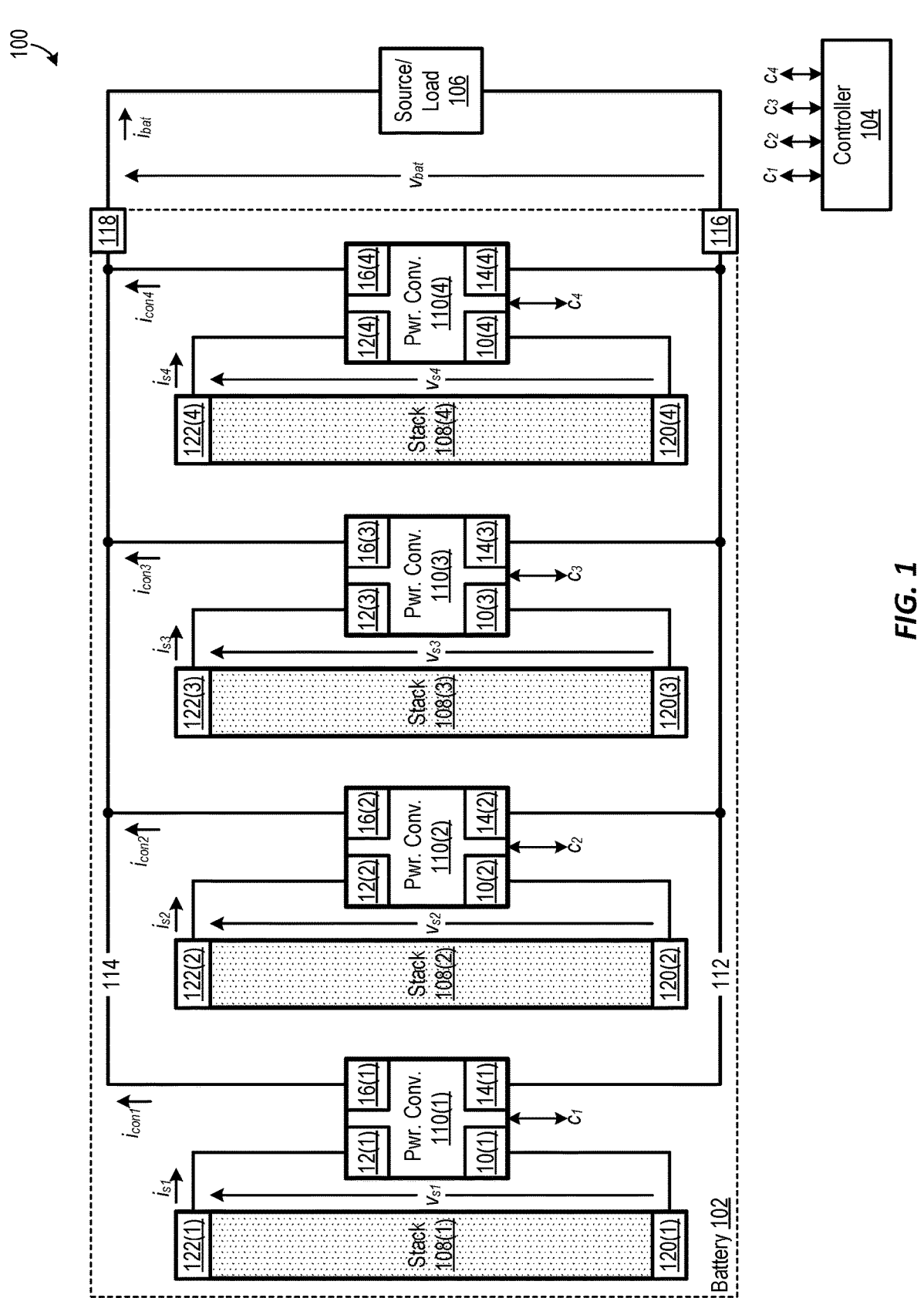
FIG. 1 is a schematic diagram of an energy storage system, according to an embodiment.

FIG. 1 is a schematic diagram of an energy storage system 100 including a battery 102, a controller 104, and a source/load 106, where controller 104 is one embodiment of the new controllers disclosed herein. Battery 102 includes a plurality of stacks 108, a plurality of power converters 110, a first power bus 112, a second power bus 114, a first battery terminal 116, and a second battery terminal 118. In this document, specific instances of an item may be referred to by use of a numeral in parentheses (e.g., stack 108(1)) while numerals without parentheses refer to any such item (e.g., stacks 108). Although FIG. 1 illustrates battery 102 as including four stacks 108, the number of stacks 108 in battery 102 may vary as long as battery 102 includes at least two stacks 108.

Each stack 108 includes one or more electrochemical cells (not shown in FIG. 1) electrically coupled between a first terminal 120 of the stack and a second terminal 122 of the stack. Each pair of first and second terminals 120 and 122 of a given stack 108 provides electrical access to the stack. In some embodiments, each first terminal 120 is a negative stack terminal, and each second terminal 122 is a positive stack terminal. Each stack 108 has a respective voltage vs across the stack, i.e., a voltage between respective terminals 120 and 122 of the stack. Specifically, stacks 108(1), 108(2), 108(3), and 108(4) have respective voltages $v_{s1}$, $v_{s2}$, $v_{s3}$, and $v_{s4}$ across the stacks. Additionally, each stack 108 has a respective current is flowing through the stack, i.e., a current flowing between terminals 120 and 122 of the stack. In particular, stacks 108(1), 108(2), 108(3), and 108(4) have respective currents $i_{s1}$, $i_{s2}$, $i_{s3}$, and $i_{s4}$ flowing through the stacks. Each stack 108(1), 108(2), 108(3), and 108(4) additionally has a respective output power $p_{s1}$, $p_{s2}$, $p_{s3}$, and $p_{s4}$, which is equal to product of the voltage vs across the stack and the current is through the stack. A stack 108 output power $p_s$ is positive if the stack 108 is providing electrical power to an external device, and a stack 108 output power $p_s$ is negative if the stack 108 is receiving electrical power from an external device.

Each stack 108 need not have the same configuration. For example, in some embodiments, two or more stacks 108 include a different number and/or a different type of constituent electrochemical cells. As another example, in certain embodiments, two or more stacks 108 have different respective internal electrical topologies. FIGS. 2-6, discussed below, illustrate several example embodiments of stacks 108. It is understood, however, that stacks 108 are not limited to these example embodiments.

Figure 2:
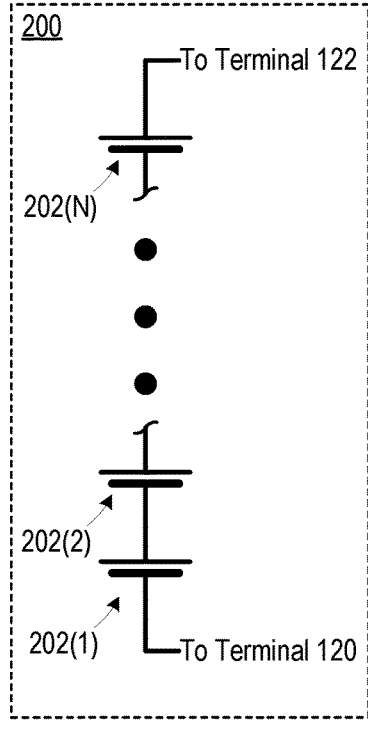
FIG. 2 is a schematic diagram of an example embodiment of a stack of the FIG. 1 energy storage system, where the stack includes a plurality of electrochemical cells electrically coupled in a series string.
Figure 3:
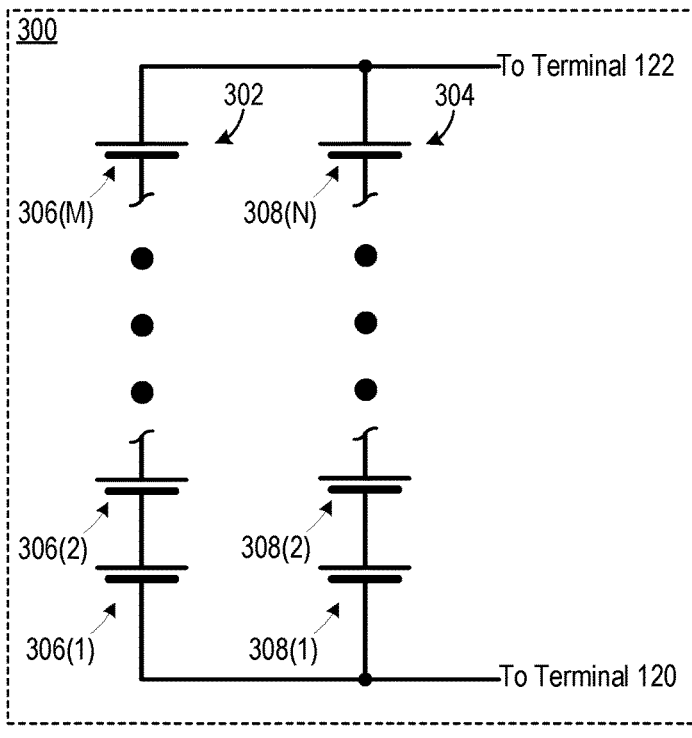
FIG. 3 is a schematic diagram of another example embodiment of a stack of the FIG. 1 energy storage system, where the stack includes two strings of a plurality of electrochemical cells electrically coupled in series.

FIG. 2 is a schematic diagram of a stack 200, which is one example embodiment of a stack 108 instance. Stack 200 includes N electrochemical cells 202 electrically coupled in a series string between first terminal 120 and second terminal 122, where N is an integer greater than one. In certain embodiments, each electrochemical cell 202 is a Lithium-ion electrochemical cell. FIG. 3 is a schematic diagram of a stack 300, which is another example embodiment of a stack 108 instance. Stack 300 includes a first string 302 and a second string 304 electrically coupled in parallel within stack 300. String 302 includes M electrochemical cells 306 electrically coupled in series between first terminal 120 and second terminal 122, and string 304 includes N electrochemical cells 308 electrically coupled in series between first terminal 120 and second terminal 122. Each of M and N is an integer greater than one, and while not required, it is anticipated that N will normally be equal to M. In certain embodiments, each electrochemical cell 306 and 308 is a Lithium-ion electrochemical cell or a group of parallel-connected Lithium-ion electrochemical cells. Stack 300 could be modified to include one or more additional strings of series-coupled electrochemical cells. In certain embodiments, stack 300 includes a large number of electrochemical cells, such as hundreds or thousands of electrochemical cells. Additionally, in certain embodiments of energy storage system 100 (FIG. 1), each stack 108 is embodied by a respective stack 300 instance configured as a container of electrochemical cells, such that battery 102 includes a large number of electrochemical cells.

Figure 4:
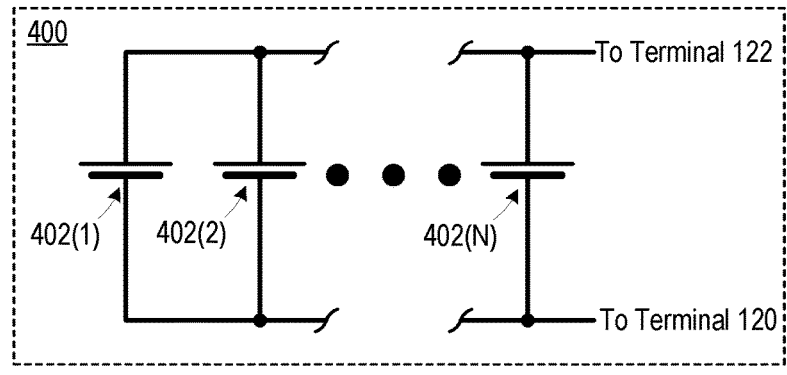
FIG. 4 is a schematic diagram of another example embodiment of a stack of the FIG. 1 energy storage system, where the stack includes a plurality of electrochemical cells electrically coupled in parallel.
Figure 5:
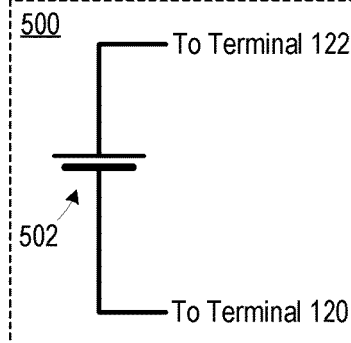
FIG. 5 is a schematic diagram of another example embodiment of a stack of the FIG. 1 energy storage system, where the stack includes a single electrochemical cell.

FIG. 4 is a schematic diagram of a stack 400, which is another example embodiment of a stack 108 instance. Stack 400 includes N electrochemical cells 402 electrically coupled in parallel between first terminal 120 and second terminal 122, where N is an integer greater than one. In certain embodiments, each electrochemical cell 402 is a Lithium-ion electrochemical cell. FIG. 5 is a schematic diagram of a stack 500, which is yet another example embodiment of a stack 108 instance. Stack 500 includes a single electrochemical cell 502 electrically coupled between first terminal 120 and second terminal 122. In some embodiments, electrochemical cell 502 is a Lithium-ion electrochemical cell or a group of parallel-connected Lithium-ion electrochemical cells.

Figure 6:
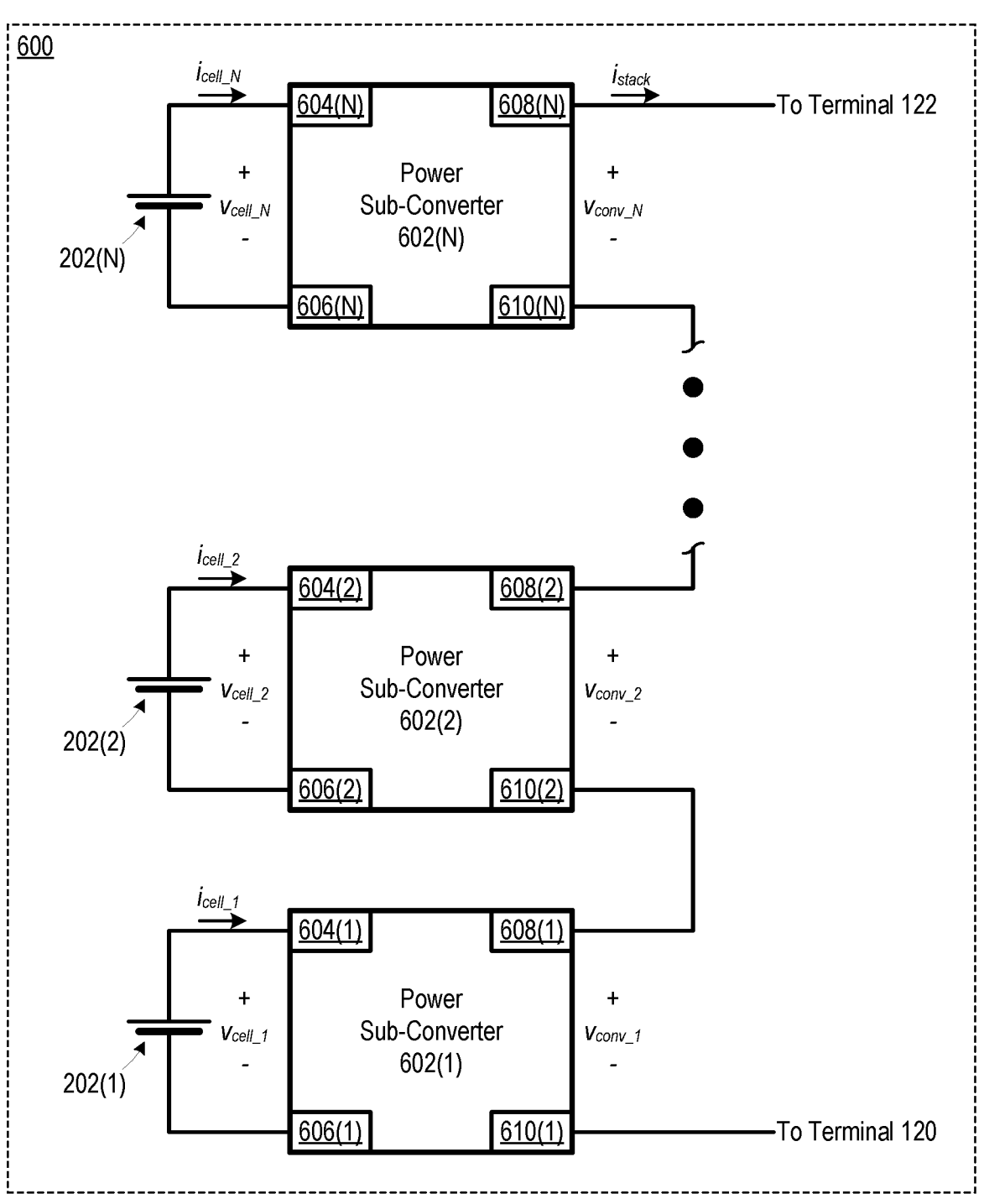
FIG. 6 is a schematic diagram of an alternate embodiment of the FIG. 2 stack further including a respective power sub-converter for each electrochemical cell.

Stacks 108 can include elements in addition to electrochemical cells. For example, any of stacks 200, 300, 400, or 500 could be modified to include one or more power sub-converters, such as to buffer one or more electrochemical cells of the stack from one or more other electrochemical cells of the stack. For instance, FIG. 6 is a schematic diagram of a stack 600, which is an alternate embodiment of stack 200 where each electrochemical cell 202 of the stack is buffered from each other electrochemical cell 202 of the stack by a respective power sub-converter 602. Each power sub-converter 602 includes cell ports 604 and 606 electrically coupled to a respective electrochemical cell 202, and each power sub-converter 602 further includes stack ports 608 and 610. Power sub-converters 602 are electrically coupled in series via between first terminal 120 and second terminal 122 via stack ports 608 and 610. Each power sub-converter 602 is configured to convert a respective cell voltage $v_{cell}$ across its cell ports 604 and 606 to a respective converter voltage $v_{conv}$ across its stack ports 608 and 610, or vice versa. Additionally, each power sub-converter 602 is configured to convert a respective cell current $i_{cell}$ flowing between its cell ports 604 and 606 to a stack current $i_{stack}$ flowing between its stack ports 608 and 610, or vice versa. In some embodiments, each power sub-converter 602 includes a direct-current-to-direct-current (DC-to-DC) converter.

Referring again to FIG. 1, each power converter 110 includes a first stack port 10, a second stack port 12, a first bus port 14, and a second bus port 16. Stacks 108 are electrically coupled in parallel in battery 102 via power converters 110, first power bus 112, and second power bus 114. Specifically, the first terminal 120 of each stack 108 is electrically coupled to the first stack port 10 of the respective power converter 110 of the stack 108, and the second terminal 122 of each stack 108 is electrically coupled to the second stack port 12 of the respective power converter 110 of the stack 108. First power bus 112 electrically couples each first bus port 14 to first battery terminal 116, and second power bus 114 electrically couples each second bus port 16 to second battery terminal 118. First battery terminal 116 and second battery terminal 118 provide an electrical interface to battery 102. Battery 102 has a voltage $v_{bat}$ across battery terminals 118 and 116, and battery 102 has a current $i_{bat}$ flowing between battery terminals 118 and 116 via source/load 106.

Stack 108 are buffered from each other by power converters 110. Consequently, respective voltages $v_{s1}$, $v_{s2}$, $v_{s3}$, and $v_{s4}$ across stacks 108(1), 108(2), 108(3), and 108(4) need not be equal to voltage $v_{bat}$ across battery terminals 116 and 118, even though stacks 108 are electrically coupled in parallel within battery 102 via their respective power converters 110. Additionally, respective voltages $v_{s1}$, $v_{s2}$, $v_{s3}$, and $v_{s4}$ across stacks 108(1), 108(2), 108(3), and 108(4) need not be equal to each other, even though stacks 108 are electrically coupled in parallel within battery 102 via their respective power converters 110. Each power converter 110 is configured to electrically interface its respective stack 108 with first and second power buses 112 and 114 by converting a voltage vs across the stack to battery voltage $v_{bat}$, or vice versa. Additionally, each power converter 110 is configured to electrically interface its respective stack 108 with first and second power buses 112 and 114 by converting a current $i_s$ flowing through the stack to a current $i_{con}$, or vice versa.

Respective currents $i_{con1}$, $i_{con2}$, $i_{con3}$, and $i_{con4}$ and flowing from power converters 110(1), 110(2), 110(3), and 110(4) to second power bus 114 sum to total battery current $i_{bat}$, and each stack 108(1), 108(2), 108(3), and 108(4) accordingly provides a respective current contribution $i_{con1}$, $i_{con2}$, $i_{con3}$, and $i_{con4}$ to total battery current $i_{bat}$. Each stack 108(1), 108(2), 108(3), and 108(4) also contributes a respective power $p_{con1}$, $p_{con2}$, $p_{con3}$, and $p_{con4}$ to source/load 106, and battery 102 provides a power $p_{bat}$ to source/load 106. Power $p_{bat}$ is equal to the sum of stack power contributions $p_{con1}$, $p_{con2}$, $p_{con3}$, and $p_{con4}$. Additionally, each stack power contribution $p_{con1}$, $p_{con2}$, $p_{con3}$, and $p_{con4}$ is equal to it respective stack output power $p_{s1}$, $p_{s2}$, $p_{s3}$, and $p_{s4}$ neglecting losses in power converters 110 and in other elements external to stacks 108. A stack 108 power contribution $p_s$ is positive if the stack 108 is providing electrical power to an external device, and a stack 108 power contribution $p_s$ is negative if the stack 108 is receiving electrical power from an external device. Similarly, power $p_{bat}$ is positive if battery 102 is supplying electrical power to source/load 106, and power $p_{bat}$ is negative if battery 102 is receiving electrical power from source/load 106.

In some embodiments, each power converter 110 is a DC-to-DC converter, such that (1) voltages $v_s$ and $v_{bat}$ are direct current (DC) voltages and (2) currents $i_s$, $i_{con}$, and $i_{bat}$ are DC currents. In some other embodiments, each power converter 110 is a direct-current-to-alternating-current (DC-to-AC) converter, such that (1) voltages $v_s$ are DC voltages, (2) currents $i_s$ are DC currents, (3) voltage $v_{bat}$ is an alternating current (AC) voltage, and (4) currents $i_{con}$ and $i_{bat}$ are AC currents. In some embodiments, each power converter 110 includes one or more of a buck converter, a boost converter, a buck-boost converter, a buck and boost converter, a flyback converter, a forward converter, a half-bridge converter, a full-bridge converter, a cúk converter, an inverter, a resonant converter, a switched-capacitor converter, and a linear regulator. In certain embodiments, power converters 110 have a non-isolated topology, while in certain other embodiments, power converters 110 have an isolated topology.

In particular embodiments, such as in embodiments where power converters 110 have a non-isolated topology, two or more of ports 10, 12, 14, 16 of each power converter 110 may be electrically coupled together. For example, in some embodiments, first stack port 10 and first bus port 14 may be electrically coupled together in each power converter 110, such that first stack port 10 and first bus port 14 are effectively merged into a single port. Additionally, one or more of ports 10, 12, 14, 16 may be omitted from power converters 110 without departing from the scope hereof. For example, in certain alternate embodiments, first stack ports 10 are omitted from power converters 110, and first terminals 120 of stacks 108 are directly electrically coupled to first power bus 112 instead of being electrically coupled to first stack ports 10.

One or more power converters 110 could include two or more power sub-converters, and each sub-converter need not be at a common physical and/or topological location in battery 102. For example, in some embodiments, each power converter 110 includes (1) a first power sub-converter configured to control charging of its respective stack 108 and (2) a second power sub-converter configured to control discharging of its respective stack 108. As another example, in particular embodiments, each power converter 110 includes a first power sub-converter that is a DC-to-DC sub-converter and a second power sub-converter that is a DC-to-AC sub-converter. In these embodiments, the DC-to-DC sub-converter is electrically coupled between a respective stack 108 and the DC-to-AC sub-converter, and the DC-to-AC sub-converter is electrically coupled between the DC-to-DC sub-converter and first and second power buses 112 and 114. The DC-to-DC sub-converter may be configured to boost magnitude of voltage $v_s$ across its respective stack 108 to a value that is sufficiently high for the DC-to-AC sub-converter to generate a required AC voltage across battery terminals 116 and 118. For instance, in particular embodiments, the DC-to-DC sub-converter is configured to boost magnitude of voltage $v_s$ across its respective stack 108 to value that is at least the square root of two ($\sqrt{2}$) times a root-mean-square (RMS) value of AC voltage across battery terminals 116 and 118.

Each power converter 110 is configured to communicate with controller 104 via respective communication signals c. Specifically, power converters 110(1), 110(2), 110(3), and 110(4) are configured to communicate with controller 104 via respective communication signals $c_1$, $c_2$, $c_3$, and $c_4$. Communication signals c include, for example, one or more of (a) commands from controller 104 to control power converters 110, (b) feedback information from power converters 110 to controller 104, and (c) feedback information from one or more optional battery management systems of stacks 108 (not shown) to controller 104. Communication links between controller 104 and power converters 110 are not shown. In some embodiments, communication signals c are transmitted between controller 104 and power converters 110 via one or more electrical communication links, one or more optical communication links, and/or one or more wireless communication links. In certain embodiments, controller 104 is configured to individually control operation of each stack 108 by controlling its respective power converter 110 via communication signals c, thereby enabling controller 104 to help maximize throughput, lifetime, and/or safety of electrochemical cells within stacks 108.

Source/load 106 is electrically coupled to battery 102 via battery terminals 116 and 118. Source/load 106 can operate as either an electric power source or as a load. Source/load 106 provides electric power to battery 102 when source/load 106 operates as an electric power source, and source/load 106 consumes electric power from battery 102 when source/load 106 operates as a load. Although source/load 106 is symbolically shown as a single element, source/load 106 could include a plurality of elements, such as a source and a load, a plurality of sources, and/or a plurality of loads. Additionally, source/load 106 may include interface devices, such as DC-to-AC converters, DC-to-DC converters, and/or transformers, configured to electrically couple battery 102 with an energy source and/or an energy sink. In some embodiments, source/load 106 includes one or more of an AC electric power system (e.g., an AC electric power grid), a DC electric power system, an electromechanical device, and a photovoltaic device, which are optionally electrically coupled to battery 102 via a DC-to-AC converter of source/load 106, a DC-to-DC converter of source/load 106, and/or a transformer of source/load 106. However, source/load 106 can take other forms without departing from the scope hereof.

Although controller 104 is illustrated as being a discrete element, controller 104 could be at least partially incorporated in battery 102. Additionally, controller 104 could be formed of multiple constituent elements which need not be co-packaged or even disposed at a common location. For example, in certain embodiments, at least some elements of controller 104 are embodied by a distributed computing system, e.g., a "cloud" computing system, such as discussed below with respect to FIG. 8. As another example, in some embodiments, elements of controller 104 are distributed among one or more stack controllers (not shown) of battery 102 and a central host controller (not shown) of battery 102 and/or energy storage system 100.

Figure 7:
FIG. 7 is a schematic diagram of one embodiment of a controller of the FIG. 1 energy storage system.
Figure 7:
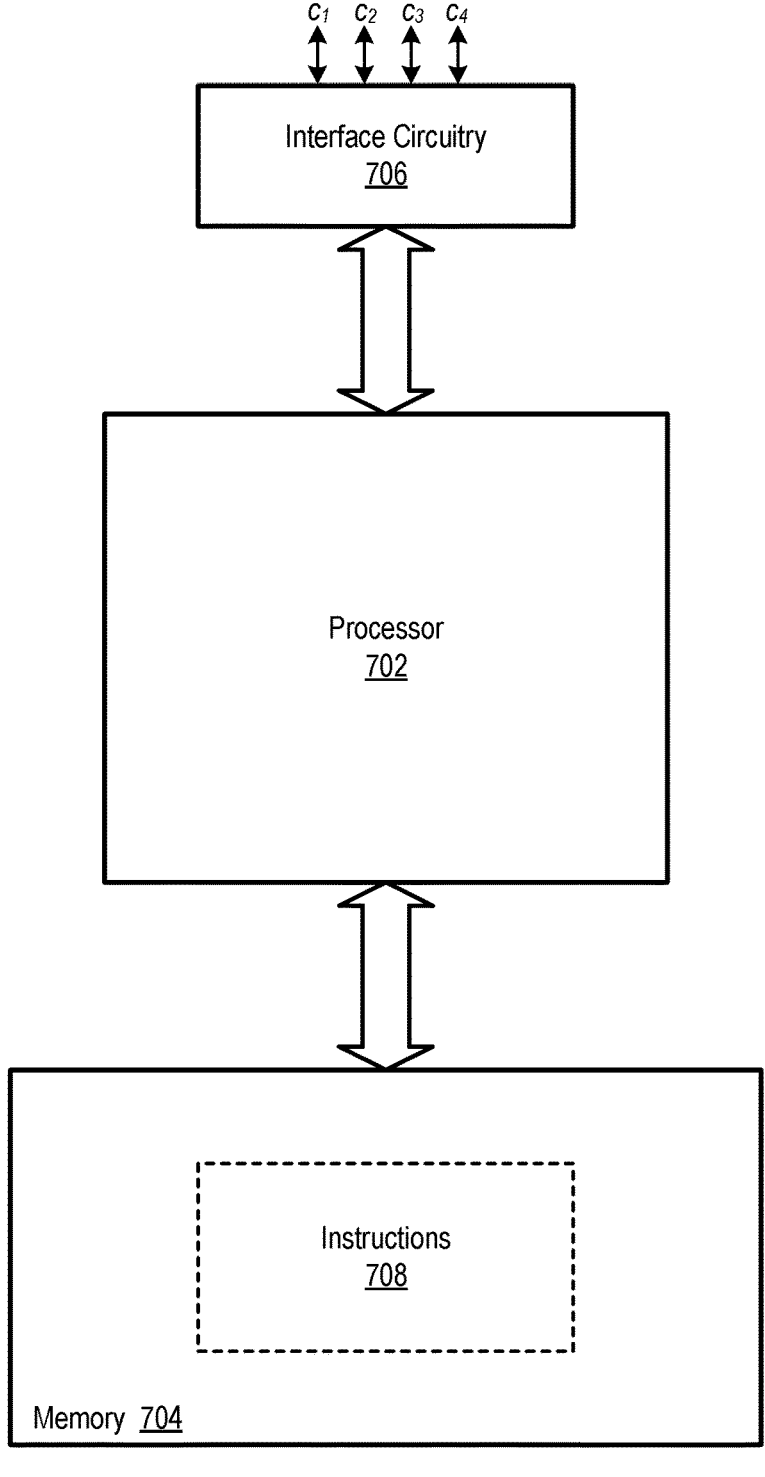
Figure 8:
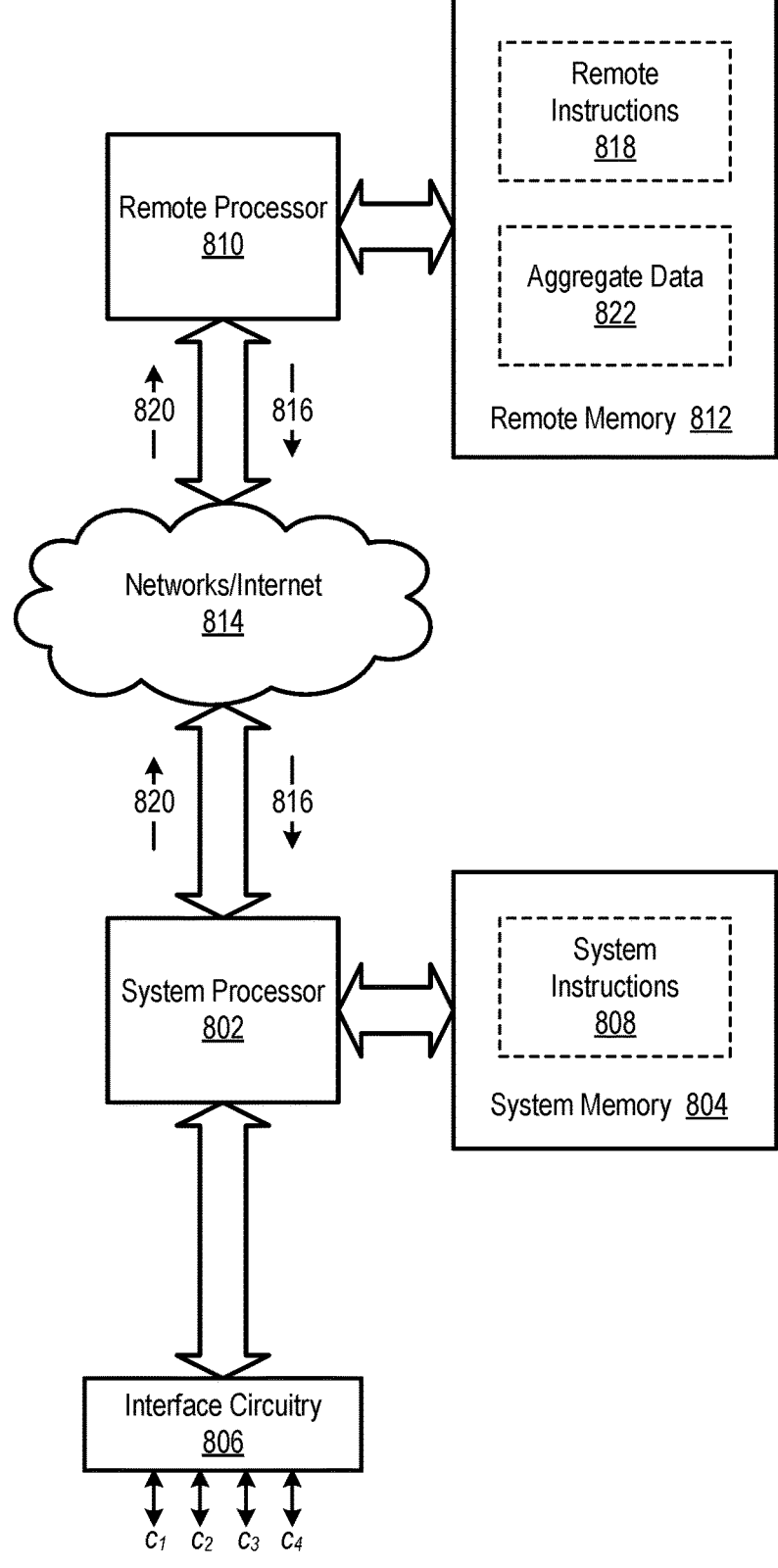
FIG. 8 is a schematic diagram of another embodiment of a controller of the FIG. 1 energy storage system.

FIGS. 7 and 8, discussed below, illustrate two example embodiments of controller 104. It is understood, however, that controller 104 is not limited to these example embodiments.

FIG. 7 is a schematic diagram of a controller 700, which is one possible embodiment of controller 104 of FIG. 1. Controller 700 includes a processor 702, a memory 704, and interface circuitry 706. Processor 702 is communicatively coupled to each of memory 704 and interface circuitry 706, and processor 702 is configured to execute instructions 708, e.g., in the form of software and/or firmware, stored in memory 704, to at least partially control operation of power converters 110 via communication signals c. In some embodiments, controller 700 is configured to control operation of power converters 110 at least partially based on information generated within energy storage system 110 and/or information provided by an external source, such as a battery data processing engine (not shown) remote from energy storage system 100. The battery data processing engine, for example, provides instructions to processor 702 to control at least some aspects of energy storage system 100 based on prior experience with other energy storage systems having one or more common traits with energy storage system 100.

Interface circuitry 706 interfaces processor 702 with one or more communication mediums (not shown) for transmitting communication signals c between controller 700 and power converters 110. In some embodiments, interface circuitry 706 includes one or more electrical transceivers, optical transceivers, and/or wireless transceivers. Controller 700 could include one or more additional processors and/or memories, and the elements of controller 700 need not be co-packaged or even disposed at a common location. Additionally, controller 700 could be modified to replace processor 702 and memory 704 with analog and/or digital circuitry which performs the same functions as processor 702 and memory 704.

FIG. 8 is a schematic diagram of a controller 800, which is another possible embodiment of controller 104 of FIG. 1. Controller 800 includes a system processor 802, a system memory 804, and interface circuitry 806 disposed, at, near, or within, battery 102. Controller 800 further includes a remote processor 810 and a remote memory 812 that are remote from battery 102. Although each of remote processor 810 and remote memory 812 is depicted as a single element, one or more of remote processor 810 and remote memory 812 may include multiple sub-elements which need not be disposed at a common location. For example, in some embodiments, remote processor 810 and remote memory 812 are implemented in a distributed computing environment. Networks/Internet 814 communicatively couple system processor 802 and remote processor 810, and networks/Internet 814 need not be part of controller 800. Additionally, remote processor 810 and remote memory 812 may be shared by one or more batteries and/or energy storage systems in addition to battery 102 and energy storage system 100, such that remote processor 810 and remote memory 812 are effectively part of a controller of one or more additional batteries and/or energy storage systems.

System processor 802 is communicatively coupled to each of system memory 804 and interface circuitry 806, and system processor 802 is configured to execute instructions 808, e.g., in the form of software and/or firmware, stored in system memory 804, to generate commands to control power converters 110 via communication signals c, at least partially in response to (1) information generated within energy storage system 100, (2) instructions/data 816 received from remote processor 810, and/or (3) instructions/ data received from other sources (not shown), such as instructions/data for remotely controlling operation of energy storage system 100. Interface circuitry 806 is analogous to interface circuitry 706 of FIG. 7.

Remote processor 810 is configured to execute remote instructions 818, in the form of software and/or firmware, stored in remote memory 812 to perform one or more of the following functions. In some embodiments, remote processor 810 is configured to receive system data 820 from system processor 802, where system data 820 represents one or more aspects of energy storage system 100. System processor 802 is configured to determine system data 820, for example, at least partially based on information generated within energy storage system 100. By way of example and not limitation, system data 820 may include battery 102 temperature, temperature of one or more stacks 108, temperature of one or more electrochemical cells within stacks 108, battery voltage $v_{bat}$, battery current $i_{bat}$, voltage $v_s$ of one or more stacks 108, current $i_s$ flowing through one or more stacks 108, voltage of one or more electrochemical cells within stacks 108, current flowing through one or more electrochemical cells within stacks 108, the type of electrochemical cells within one or more stacks 108, the configuration of one or more stacks 108, manufacturing information for one or more stacks 108 and/or for electrochemical cells therein, maintenance history of one or more stacks 108 and/or electrochemical cells therein, etc. System data 820 may alternately or additionally include information that is derived by system processor 802, or information that algorithmically determined by system processor 802, such as one or more of stack 108 state of charge, stack 108 state of health, stack 108 state of degradation, stack 108 state of safety, stack 108 estimated remaining useful life, stack 108 usage history, etc. System data 820 is optionally encrypted, compressed, and/or preprocessed (e.g., identifying various degradation mechanisms and/or hazardous operating conditions) before being sent from system processor 802 to remote processor 810.

In some embodiments, remote processor 810 is configured to perform one or more processing tasks in place of system processor 802, or to perform one or more processing tasks in conjunction with system processor 802, such as in embodiments where remote processor 810 has significantly greater processing capability than system processor 802. Remote processor 810 may also be configured to help manage energy storage system 100 at least partially based on information generated external to energy storage system 100.

For example, in particular embodiments, remote processor 810 compares system data 820 to aggregate data 822 to find common traits between the two data sets. Aggregate data 822 includes data from multiple energy storage systems, e.g., from tens, hundreds, or even thousands of energy storage systems. Remote processor 810 optionally adds information it receives from energy storage systems to aggregate data 822, such that aggregate data 822 grows over time. Examples of common traits between system data 820 and aggregate data 822 include, but are not limited to, electrochemical cells operating under the same or similar conditions, electrochemical cells with the same or similar operation duration, electrochemical cells with the same or similar energy throughput, electrochemical cells from a common manufacturing lot, electrochemical cells with the same or similar installation, electrochemical cells stored under the same or similar conditions, electrochemical cells with the same or similar maintenance history, electrochemical cells with similar arc fault signatures, electrochemical cells having the same or similar degradation characteristics or mechanisms (e.g., the same or similar lithium inventory loss, lithium plating, loss of active site material, and/or electrode impedance build up), electrochemical cells having the same or similar safety characteristics (e.g., the same or similar failure mechanisms such as dendritic shorts or cell leakage), electrochemical cells having the same or similar known or observed manufacturing defects, etc. In some embodiments, remote processor 810 uses self-learning methodologies (e.g., machine-learning, deep-learning, or even multi-modal machine learning) to identify common traits between system data 820 and aggregate data 822.

Remote processor 810 may subsequently identify data that is applicable to energy storage system 100 from the common traits between system data 820 and aggregate data 822. More specifically, remote processor 810 may identify data in aggregate data 822 that is associated with energy storage systems having common traits with energy storage system 100, as being applicable data. For example, remote processor 810 may identify data from an energy storage system having the same type of electrochemical cells as energy storage system 100 as being applicable data. As another example, remote processor 810 may identify data from an energy storage system operating under similar conditions to energy storage system 100 as being applicable data. The applicable data may be either indirectly related or directly related to data associated with energy storage systems having common traits with energy storage system 100. In some embodiments, remote processor 810 uses self-learning methodologies (e.g., machine-learning, deep-learning, or even multi-modal machine learning) to identify the applicable data from aggregate data 822.

Remote processor 810 may determine instructions/data 816 from the applicable data. Instructions/data 816 may include instructions for energy storage system 100 based on the applicable data, and/or instructions/data 816 may include the applicable data itself. Remote processor 810 sends instructions/data 816 to system processor 802. Energy storage system 100 optionally uses instructions/data 816 to manage one or more aspects of energy storage system 100. For example, in particular embodiments, controller 800 uses instructions/data 816 to build or refine models of electrochemical cells within stacks 108, such as for controlling charging/discharging of stacks 108 or for identifying and/or mitigating degradation or failure mechanisms of electrochemical cells within stacks 108.

Figure 9:
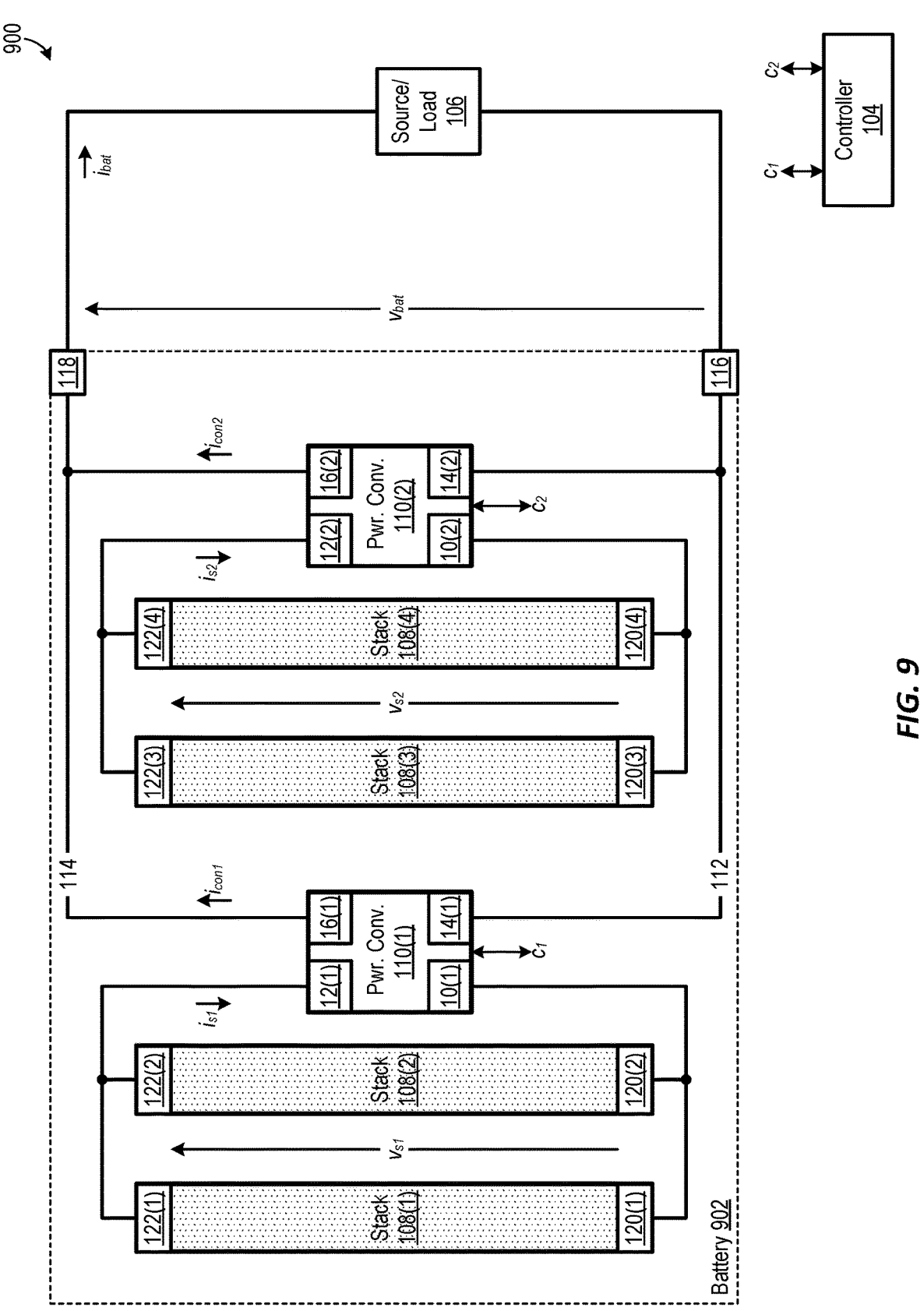
FIG. 9 is a schematic diagram of an alternate embodiment of the FIG. 1 energy storage system.
Figure 10:
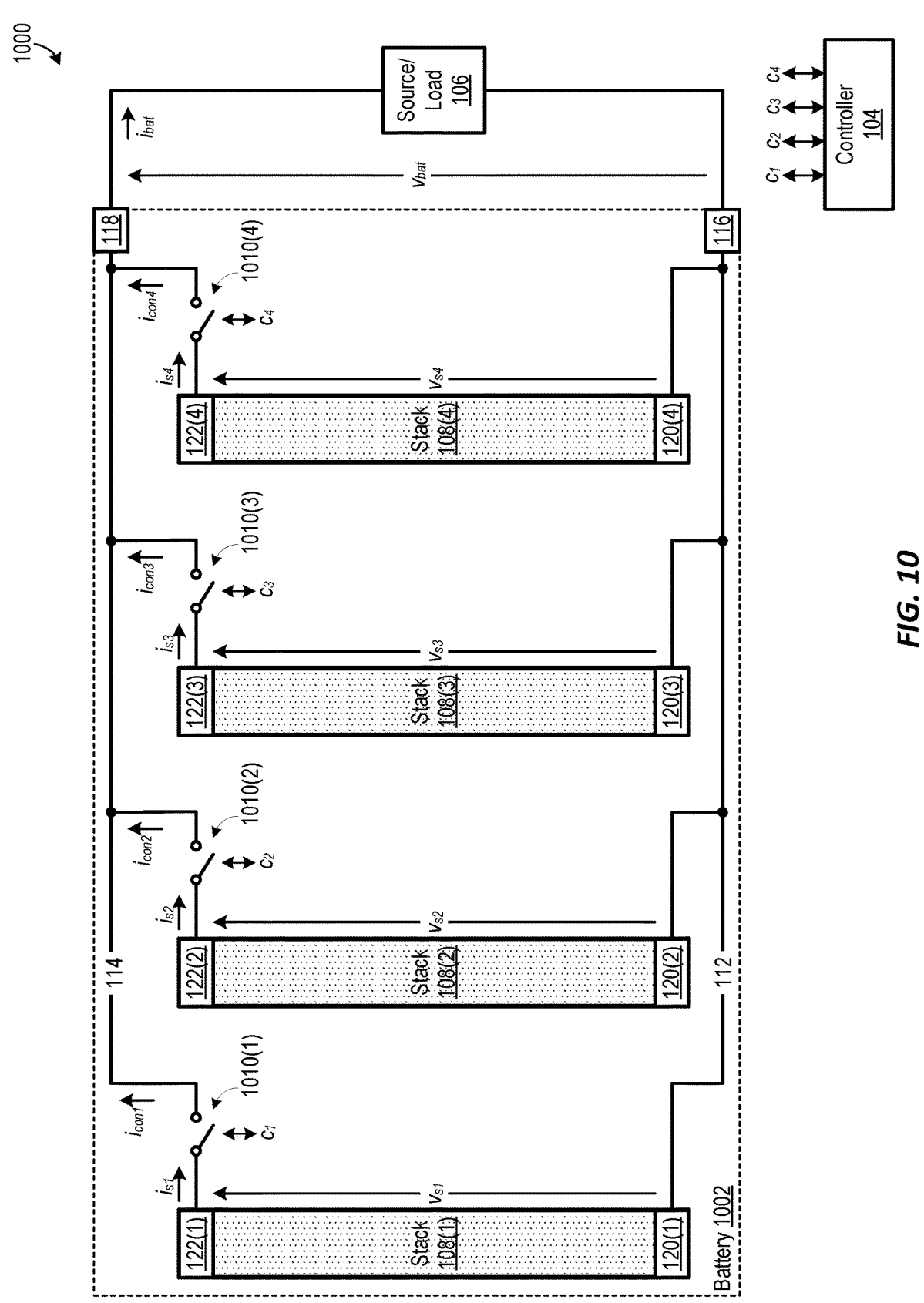
FIG. 10 is a schematic diagram of another alternate embodiment of the FIG. 1 energy storage system.

Referring again to FIG. 1, battery 102 may be modified without departing from the scope hereof as long as battery 102 includes at least two stacks 108 that are electrically coupled in parallel via two or more power converters controllable by controller 104. FIGS. 9 and 10, discussed below, illustrate a couple of alternate embodiments of battery 102. It is understood, however, that battery 102 may have additional alternate configurations without departing from the scope hereof.

FIG. 9 is a schematic diagram of an energy storage system 900, which is an alternate embodiment of energy storage system 100 of FIG. 1 where battery 102 is a replaced with a battery 902. Battery 902 is like battery 102 except that pairs of stacks 108 share a common power converter 110. Specifically, stacks 108(1) and 108(2) are collectively interfaced to first and second power buses 112 and 114 via power converter 110(1), and stacks 108(3) and 108(4) are collectively interfaced to first and second power buses 112 and 114 via power converter 110(2). Consequently, stacks 108(1) and 108(2) must be controlled in unison, and stacks 108(3) and 108(4) must also be controlled in unison. However, controller 104 may control pair of stacks 108(1) and 108(2) independently of pair of stacks 108(3) and 108(4). Stacks 108(1) and 108(2) have a common voltage $v_{s1}$ across these two stacks, and stacks 108(3) and 108(4) have a common voltage $v_{s2}$ across these two stacks. Current $i_{s1}$ collectively flows from stacks 108(1) and 108(2) to power converter 110(1), and current $i_{s2}$ collectively flows from stacks 108(3) and 108(4) to power converter 110(2). Accordingly, stacks 108(1) and 108(2) collectively contribute to current $i_{bat}$ via current $i_{con1}$, and stacks 108(3) and 108(4) collectively contribute to current $i_{bat}$ via current $i_{con2}$.

Power converters 110 of energy storage system 900 operate in the same manner as power converters 110 of energy storage system 100 except that each power converter 110 of energy storage system 900 serves two stacks 108, instead of serving a single stack 108. For example, power converter 110(1) of energy system 900 converts voltage $v_{s1}$ across stacks 108(1) and 108(2) to battery voltage $v_{bat}$, or vice versa. As another example, power converter 110(1) of energy system 900 converts current $i_{s1}$ collectively flowing through both of stacks 108(1) and 108(2) to current $i_{con1}$, or vice versa. Battery 902 could be modified so that one or more power converters 110 serve three or more respective stacks 108 instead of two respective stacks 108. Additionally, battery 902 could be modified so that at least two power converters 110 serve different numbers of respective stacks 108.

Referring again to FIG. 1, in some alternate embodiments, one or more power converters 110 do not have voltage or current conversion capability but are nevertheless capable of selectively connecting or disconnecting a respective stack 108 from first power bus 112 and/or second power bus 114. In these alternate embodiments, each power converter 110 includes, for example, one or more switching devices configured to selectively connect or disconnect its respective stack 108 from first power bus 112 and/or second power bus 114. For example, FIG. 10 is a schematic diagram of an energy storage system 1000, which is an alternate embodiment of energy storage system 100 of FIG. 1 where battery 102 is a replaced with a battery 1002. Battery 1002 is like battery 102, except that power converters 110 are embodied by disconnect switches 1010 controlled via communication signals c. Each disconnect switch 1010 is electrically coupled between the second terminal 122 of a respective stack 108 and second power bus 114. First terminals 120 of stacks 108 are directly electrically coupled to first power bus 112. For each stack 108, its respective current $i_{con}$ is equal to its respective current is when its respective disconnect switch 1010 is closed, and its respective currents $i_{con}$ and $i_s$ are equal to zero when its respective disconnect switch 1010 is open.

Global Operating Strategies

Controller 104 is configured to control energy storage systems 100, 900, and 1000 to execute a global operating strategy for batteries 102, 902, and 1002, respectively. A global operating strategy for a battery is an operating strategy for the entire battery. A global operating strategy may be static or dynamic. Examples of global operating strategies for batteries 102, 902, and 1002 include, but are not limited to, (1) providing substantially constant power to source/load 106, (2) providing substantially constant current $i_{bat}$ to source/load 106, (3) providing substantially constant voltage $v_{bat}$ to source/load 106, (4) receiving substantially constant power from source/load 106 to charge electrochemical cells of stacks 108, (5) receiving substantially constant voltage from source/load 106 to charge electrochemical cells of stacks 108, (6) receiving substantially constant current from source/load 106 to charge electrochemical cells of stacks 108, (7) operating the battery in a standby mode where the battery neither provides power to source/load 106 nor receives power from source/load 106, (8) maintaining a constant overall state of charge of the battery, (9) maintaining a constant overall rate of charge, or rate of discharge, of the battery, (10) maintaining stacks 108 at substantially the same state of charge as the stacks charge or discharge, (11) stabilizing output power of an external power generation system, such as a photovoltaic power generation system, by absorbing excess power from the power generation system or by providing power to compensate for a shortage in power produced by the power generation system, and (12) stabilizing frequency and/or voltage of an AC power grid by absorbing power from the AC power grid or providing power to the AC power grid. It should be noted that a global operating strategy may include more than one component. For example, a global operating strategy may include maintaining a substantially constant state of charge among stacks 108 while providing a constant power to source/load 106 or while receiving a constant power from source/load 106. As another example, a global operating strategy may include maintaining a substantially constant state of charge among stacks 108 while providing a constant current $i_{bat}$ to source/load 106.

In this document, "substantially" means within plus or minus ten percent. For example, a number X is substantially equal to a number Y if (0.9 Y)≤X≤(1.1 Y). Additionally, a value in this document is "substantially constant" if the value remains within plus or minus ten percent of a reference value. For example, a value Z is substantially constant if (0.9 R)≤Z≤(1.1 R), where R is a reference value for Z. Reference value R is, for example, a target value of Z, an intended value of Z, an average value of Z, a median value of Z, etc.

Local Operating Strategies

Controller 104 is further configured to control energy storage systems 100, 900, and 1000 to execute a local operating strategy for batteries 102, 902, and 1002, respectively. A local operating strategy is a strategy for operating a specific subset of stacks 108 of a battery 102, 902, or 1002, where the subset does not include all stacks 108 of the battery. A local operating strategy may be static or dynamic. Examples of local operating strategies for batteries 102, 902, and 1002 include, but are not limited to, (1) operating one or more stacks 108 of the battery in an open circuit mode, (2) operating one or more stacks 108 of the battery in a constant power mode, (3) operating one or more stacks 108 of the battery in a constant current mode, (4) operating one or more stacks 108 of the battery in a constant voltage mode, (5) operating one or more stacks 108 of the battery at a different power level than one or more other stacks 108 of the battery, (6) operating one or more stacks 108 of the battery at a different charge or discharge rate than one or more other stacks 108 of the battery, (7) repeatedly changing an operating point of one or more stacks 108 of the battery, and (8) causing one or more stacks 108 of the battery to move toward a different state of charge than one or more other stacks 108 of the battery. In some embodiments, controller 104 is configured to control energy storage systems 100, 900, and 1000 to execute a local operating strategy for batteries 102, 902, and 1002, respectively, according to a predetermined schedule (e.g., periodically) or on-demand (e.g., in response to signal to perform a diagnostic test on one or more stacks 108).

An open circuit operating mode of a stack 108 is a mode where the stack is at least partially electrically decoupled from other stacks 108 of a battery. For example, stack 108(1) of battery 102 operates in an open circuit mode if stack 108(1) is electrically decoupled from stacks 108(2)-108(4) of battery 102. Controller 104 may cause stack 108(1) of battery 102 to operate in an open circuit mode, for example, by causing power converter 110(1) to electrically isolate stack 108(1) from first power bus 112 and/or second power bus 114, such as by operating power converter 110(1) in a manner which creates a high impedance between (a) stack 108(1) and (b) first power bus 112 and/or second power bus 114, or by opening a disconnect switch (e.g., a disconnect switch 1010 of FIG. 10) directly or indirectly electrically coupling stack 108(1) to first power bus 112 or second power bus 114.

A constant power operating mode of a stack 108 is an operating mode where power provided by the stack, or power received by the stack, is substantially constant. For example, controller 104 may cause stack 108(1) of battery 102 to operate in a constant power mode by controlling power converter 110(1) such that a product of voltage $v_{s1}$ and current $i_{s1}$ is substantially constant.

A constant current operating mode of a stack 108 is an operating mode where magnitude of current flowing through the stack is substantially constant. For example, controller 104 may cause stack 108(1) of battery 102 to operate in a constant current mode by controlling power converter 110 (1) such that magnitude of current $i_{s1}$ is substantially constant. A constant voltage mode of a stack 108 is an operating mode where magnitude of voltage across the stack is substantially constant. For example, controller 104 may cause stack 108(1) of battery 102 to operate in a constant voltage mode by controlling power converter 110(1) such that magnitude of voltage $v_{s1}$ is substantially constant.

Controller 104 may cause one or more stacks 108 to operate at a different power level than one or more other stacks 108 by controlling one or more power converters electrically coupled to the stacks. For example, controller 104 may cause stack 108(1) of battery 102 to operate at a different power level than stack 108(2) of battery 102 by controlling power converter 110(1) such that a product of $v_{s1}$ and $i_{s1}$ for stack 108(1) is different from a product of $v_{s2}$ and $i_{s2}$ for stack 108(2).

Controller 104 may operate one or more stacks 108 at a different rate of charge or discharge than one or more other stacks 108 by controlling one or more power converters electrically coupled to the stacks. For example, controller 104 may cause stack 108(1) of battery 102 to operate at a lower discharge rate than stacks 108(2)-108(4) of battery 102 by controlling power converter 110(1) to decrease magnitude of current $i_{s1}$ flowing through stack 108(1) relative to currents $i_{s2}$, $i_{s3}$, and $i_{s4}$ flowing through stacks 108(2), 108(3), and 108(4), respectively. As another example, controller 104 may cause stack 108(1) of battery 102 to operate at a lower discharge rate than stacks 108(2)-108(4) of battery 102 by controlling power converters 110(2), 110(3), and 110(4) to increase magnitude of currents $i_{s2}$, $i_{s3}$, and $i_{s4}$ flowing through stacks 108(2), 108(3), and 108(4), respectively, relative to current $i_{s1}$ flowing through stack 108(1).

Controller 104 may repeatedly change an operating point of one or more stacks 108 by controlling one or more power converters electrically coupled to the stacks 108. For example, controller 104 may repeatedly change an operating point of stack 108(4) of battery 102 by causing power converter 110(4) to repeatedly switch between a constant voltage mode and a constant current mode. As another example, controller 104 may repeatedly change an operating point of stack 108(4) to cause stack current $i_{s4}$ to repeatedly switch between two or more different values.

Controller 104 may cause one or more stacks 108 to move toward a different state of charge than one or more other stacks 108 by controlling one or more power converters electrically coupled to the stacks 108. For example, controller 104 may cause stack 108(3) of battery 102 to move toward a different state of charge than stacks 108(1), 108(2), and 108(4) of battery 102 by controlling power converter 110(3) to either (1) increase or decrease rate of discharge of stack 108(3) relative to rate of discharge of each of stacks 108(1), 108(2), and 108(4), or (2) increase or decrease rate of charge of stack 108(3) relative to rate of charge of each of stacks 108(1), 108(2), and 108(4). As another example, controller 104 may cause stack 108(3) of battery 102 to move toward a different state of charge than stacks 108(1), 108(2), and 108(4) of battery 102 by controlling power converters 110(1), 110(2), and 110(4) to either (1) increase or decrease rate of discharge of each of stack 108(1), 108(2), and 108(4) relative to rate of discharge of stack 108(3), or (2) increase or decrease rate of charge of stacks 108(1), 108(2) and 108(4) relative to rate of charge of stack 108(3).

Controller 104 may execute a local operating strategy, for example, to achieve an objective with respect to one or more stacks 108 or to address an anomaly associated with one or more stacks 108. Discussed below with respect to Examples A1-A9 are several example scenarios where controller 104 executes a local operating strategy. It is understood, though, that controller 104 may be configured to execute additional and/or alternative local operating strategies, as well as to execute a local operating strategy for reasons different than those discussed below, without departing from the scope hereof.

Example A1

Electrochemical Cell Diagnostic Test

Some embodiments of controller 104 are configured to execute a local operating strategy to perform an in-situ diagnostic test on electrochemical cells of a stack 108 while a battery including the stack 108 is operating in accordance with a global strategy servicing source/load 106. Such diagnostic test may include, for example, (a) executing one or more local operating strategies to cause the stack 108 to operate at one or more operating points required to perform the diagnostic test, (b) measuring one or more parameters of the stack 108 while executing the one or more local operating strategies, and (c) analyzing one or more of the measured parameters to determine one or more characteristics of the electrochemical cells of the stack 108. Controller 104 may execute one or more local operating strategies, for example, to perturb electrochemical cells of the stack 108 and/or to enable certain measurements to be made to the stack 108, as required by the diagnostic test. Examples of possible characteristics determined by the diagnostic test include, but are not limited to, electrochemical cell impedance, electrochemical cell leakage current, amount of active material in anodes or cathodes of electrochemical cells, and electrochemical cell open circuit voltage, as well as related characteristics, such as electrochemical cell state of health, electrochemical cell state of degradation, and electrochemical cell state of safety.

Example A2

Reduce State of Charge Variations

It is generally desirable that stacks 108 have substantially the same state of charge at any given time. Accordingly, some embodiments of controller 104 are configured to execute a local operating strategy to reduce variations in state of charge among stacks 108, such as in response to difference in state of charge between stacks crossing a threshold value. For example, assume that stack 108(1) of battery 102 is at a higher state of charge than stacks 108(2)-108(4) of battery 102. Controller 104 could be configured to execute a local operating strategy of decreasing rate of charge of stack 108(1) relative to rate of charge of stacks 108(2)-108(4) of battery 102, to reduce variation in state of charge of among stacks 108. Controller 104 could alternately be configured to execute a local operating strategy increase rate of discharge of stack 108(1) relative to rate of discharge of stacks 108(2)-108(4) of battery 102, to reduce variation in state of charge of among stacks 108. Additionally, controller 104 could be configured to execute a local operating strategy to increase rate of charge of stacks 108(2)-108(4) of battery 102 relative to rate of charge of stack 108(1) of battery 102, to reduce variation in state of charge of among stacks 108. Furthermore, controller 104 could be configured to execute a local operating strategy to reduce rate of discharge of stacks 108(2)-108(4) of battery 102 relative to rate of discharge of stack 108(1) of battery 102, to reduce variation in state of charge of among stacks 108.

Example A3

Respond to Variations in Stack Capacity

Energy storage capacity among stacks 108 may vary, such as due to differences in configuration of stacks 108, differences in ages of electrochemical cells among stacks 108, differences in manufacturing of electrochemical cells among stacks 108, differences in chemistry of electrochemical cells among stacks 108, differences in size of electrochemical cells among stacks 108, differences in operation of electrochemical cells among stacks 108, differences in maintenance of electrochemical cells among stacks 108, differences in operating environment among electrochemical cells of stacks 108, etc. Variations in energy storage capacity among stacks 108 may cause some stacks 108 to be more quickly charged or discharged than other stacks 108. For example, a stack 108 with a smaller capacity will reach its fully charged state more quickly than a stack 108 with a larger capacity, assuming equal charging current for both stacks. Therefore, some embodiments of controller 104 are configured to execute a local operating strategy in response to variations in capacity among stacks 108, such as to help ensure that all stacks 108 reach a fully charged state, or a fully discharged state, at substantially the same time. For example, assume that stack 108(4) of battery 102 has a smaller capacity than stacks 108(1)-108(3) of battery 102. Controller 104 may be configured to execute a local operating strategy to cause stack 108(4) to be discharged at slower rate than stacks 108(1)-108(3), such as by changing $i_{s4}$ and/or $v_{s4}$ of stack 108(4), to help prevent stack 108(4) from reaching its fully discharged state earlier than stacks 108(1)-108(3).

Controller 104 may alternately be configured to respond to variations in energy storage capacity among stacks 108 by executing a local operating strategy to change depth of discharge of a stack 108, change maximum state of charge of a stack 108, and/or change minimum state of charge of a stack 108. For example, assume again that stack 108(4) of battery 102 has a smaller capacity than stacks 108(1)-108(3) of battery 102. Controller 104 may be configured to execute a local operating strategy to reduce a permissible depth of discharge of stack 108(4) relative to respective permissible depths of discharge of stacks 108(1)-108(3), to prevent damage to stack 108(4) due to excessive discharge.

Example A4

Reach Maximum or Minimum State of Charge at a Common Time

Stacks 108 may reach respective maximum states of charge or respective minimum states of charge at different times when charged or discharged at a common rate due to differences in configuration of stacks 108, differences in ages of electrochemical cells among stacks 108, differences in manufacturing of electrochemical cells among stacks 108, differences in chemistry of electrochemical cells among stacks 108, differences in size of electrochemical cells among stacks 108, differences in operation of electrochemical cells among stacks 108, differences in maintenance of electrochemical cells among stacks 108, differences in operating environment among electrochemical cells of stacks 108, etc. It is often desirable that all stacks 108 reach a respective maximum state of charge at a common time during a charging cycle, as well as that all stacks 108 reach a respective minimum state of charge at a common time during a discharging cycle. Accordingly, some embodiments of controller 104 are configured to execute a local operating strategy to cause each stack 108 to reach a predetermined minimum state of charge, or a predetermined minimum voltage, at a substantially common time. For example, assume that stack 108(1) of battery 102 is discharging at a faster rate than stacks 108(2)-108(4) of battery 102. Controller 104 may be configured to execute a local operating strategy to reduce a power contribution of stack 108(1) to source/load 106 relative respective power contributions of stacks 108(2)-108(4) to source load/load 106, such that stack 108(1) reaches its minimum state of charge at substantially the same time that stacks 108(2)-108(4) reach their respective minimum states of charge.

Additionally, some embodiments of controller 104 are configured to execute a local operating strategy to cause each stack 108 to reach a predetermined maximum state of charge, or a predetermined maximum voltage, at a substantially common time. For example, assume that stack 108(1) of battery 102 is charging at a faster rate than stacks 108(2)-108(4) of battery 102. Controller 104 may be configured to execute a local operating strategy to decrease magnitude of charging current to stack 108(1) while leaving magnitude of respective charging currents to stacks 108(2)-108(4) unchanged, such that stack 108(1) reaches its maximum state of charge at substantially the same time that stacks 108(2)-108(4) reach their respective maximum states of charge.

Example A5

Address Excessive State of Degradation

Certain embodiments of controller 104 are configured to execute a local operating strategy in response to a state of degradation of one or more stacks 108 crossing a threshold value. In this document, "state of degradation" of a stack 108 means electrochemical characteristics of electrochemical cells of the stack 108 indicative of overall electrochemical cell performance and health. In some embodiments, state of degradation of a stack 108 is at least partially determined based on impedance of electrochemical cells of the stack 108, amount of active material on anodes and/or cathodes of electrochemical cells of the stack 108, and/or leakage current of electrochemical cells of the stack 108. As one example of controller 104 executing a local operating strategy based on state of degradation, consider an example scenario where controller 104 is configured to determine a respective state of degradation (SOD) value for each stack 108 of battery 102, where the higher the SOD value of a stack 108, the greater the degradation of the stack 108. Assume that the SOD value for stack 108(1) of battery 102 increases and crosses a first threshold value, where the first threshold value represents a maximum state of degradation of a stack 108 that is permitted under normal operating conditions of the stack 108. Controller 104 may execute a local operating strategy in response to the SOD value of stack 108(1) crossing the first threshold value. In some embodiments, the local operating strategy includes changing $i_{s1}$ of stack 108(1), changing $v_{s1}$ of stack 108(1), limiting maximum magnitude of current $i_{s1}$, limiting maximum and/or minimum magnitude of voltage $v_{s1}$, limiting depth of discharge of stack 108(1), etc., such as to reverse degradation of stack 108(1), prevent further degradation of stack 108(1), and/or prevent an unsafe operating condition due to degradation of stack 108. Additionally, the local operating strategy may be dynamic. For example, the local operating strategy may change as a function of temperature of stack 108(1).

Example A6

Address State of Safety

Certain embodiments of controller 104 are configured to execute a local operating strategy in response to a state of safety of one or more stacks 108 crossing a threshold value. In this document, "state of safety" of a stack 108 means electrochemical characteristics of electrochemical cells of the stack 108 indicative of risk of an unsafe failure of the electrochemical cells. As one example of controller 104 executing a local operating strategy based on state of safety, consider an example scenario where controller 104 is configured to determine a respective state of safety (SOS) value for each stack 108 of battery 102, where the higher the SOS value of a stack 108, the greater the risk of an unsafe failure of electrochemical cells of the stack 108. Assume that the SOS value for stack 108(1) of battery 102 increases and crosses a first threshold value, where the first threshold value represents a maximum state of safety of a stack 108 that is permitted under normal operating conditions of the stack 108. Controller 104 may execute a local operating strategy in response to the SOS value of stack 108(1) crossing the first threshold value. In some embodiments, the local operating strategy includes changing $i_{s1}$ and/or $v_{s1}$ of stack 108(1), limiting maximum magnitude of current $i_{s1}$, limiting maximum and/or minimum magnitude of voltage $v_{s1}$, limiting depth of discharge of stack 108(1), etc., such as to prevent a failure of stack 108(1) or to prevent stack 108(1) from failing in an unsafe manner. Additionally, the local operating strategy may be dynamic. For example, the local operating strategy may change as a function of temperature of stack 108(1).

Example A7

Compensate for Excessive Resistance

Particular embodiments of controller 104 are configured to execute a local operating strategy to help compensate for variations in electrochemical resistance and/or electrical resistance among stacks 108. For example, assume that stack 108(3) of battery 102 has a higher resistance than batteries 108(1), 108(2), and 108(4). Controller 104 may execute a local operating strategy to reduce magnitude of current $is_3$ through stack 108(3) relative to magnitude of respective currents $is_1$, $is_2$, and $is_4$ through stacks 108(1), 108(2), and 108(4), such as to help prevent excessive heating of stack 108(3) and/or help prevent voltage drop in stack 108(3), due to its high resistance. Alternately, controller 104 may execute a local operating strategy to reduce magnitude of power $p_{s3}$ of stack 108(3) relative to magnitude of respective powers $p_{s1}$, $p_{s2}$, and $p_{s4}$ of stacks 108(1), 108(2), and 108(4), thereby indirectly reducing magnitude of current $i_{s3}$ through stack 108(3).

Example A8

Address Loss of Electrochemical Cell Active Material

Some embodiments of controller 104 are configured to execute a local operating strategy to address loss of active material on anodes or cathodes of electrochemical cells of stacks 108. For example, assume that electrochemical cells of stack 108(1) of battery 102 experience loss of active material on their anodes. Controller 104 may execute a local operating strategy to modify current $i_{s1}$ or voltage $v_{s1}$ of stack 108(1) to address the loss of active material, such as by reducing current $i_{s1}$, power $p_{s1}$, a permissible range of voltage $v_{s1}$, or permissible depth of discharge of stack 108(1), to minimize further loss of active material relative to stacks 108(2)-108(4).

Example A9

Help Achieve Equal Stack Lifetimes

Certain embodiments of controller 104 are configured to execute one or more local operating strategies to help achieve substantially equal lifetimes of stacks 108. Stack 108 lifetime may be defined, for instance, as amount of time a stack 108 may operate before reaching a predetermined capacity fade or before reaching a predetermined degradation in state of health. Controller 104 may execute a local operating strategy, for example, to modify current is of a stack 108, maximum magnitude of current is of a stack 108, maximum and/or minimum permissible magnitude of voltage $v_s$ of a stack 108, maximum power $p_s$ of a stack 108, or maximum depth of discharge of a stack 108, to help achieve a lifetime of the stack 108 that is substantially equal to respective lifetimes of other stacks 108 of an associated battery.

Simultaneous Execution of Local and Global Operating Strategies

Executing a local operating strategy for a battery may interfere with execution of a global operating strategy for the battery. For example, assume that controller 104 of battery 102 is executing a global operating strategy of supplying a constant power of 40,000 watts to source/load 106 by causing each stack 108 of battery 102 to provide 10,000 watts to source/load 106. Now assume that controller 104 executes a local operating strategy for stack 108(1) by operating the stack at a constant power of 5,000 watts, instead of at 10,000 watts. Executing the local operating strategy would reduce the power output of battery 102 from 40,000 watts to 35,000 watts, thereby interfering with the global operating strategy of supplying a constant power of 40,000 watts to source/load 106.

However, controller 104 is advantageously configured to control stacks 108 to compensate for changes to stack operating conditions resulting from executing a local operating strategy, thereby preventing the local operating strategy from interfering with the global operating strategy. For example, consider again the example above where controller 104 of battery 102 is executing a global operating strategy of supplying a constant power of 40,000 watts to source/load 106 by causing each stack 108 of battery 102 to provide 10,000 watts to source/load 106. Assume again that controller 104 executes a local operating strategy for stack 108(1) by operating the stack at a constant power of 5,000 watts, instead of at 10,000 watts. Controller 104 is configured to change an operating point of one or more of stacks 108(2)-108(4) to compensate for the change in operating point of stack 108(1) caused by executing the local operating strategy, i.e., to offset the 5,000 watts reduction in operating power of stack 108(1) with additional power from one or more other stacks 108(2)-108(4). For example, controller 104 may cause stack 108(2) to increase its output power from 10,000 watts to 15,000 watts, such that battery 102 still provides 40,000 watts to source/load 106. As another example, controller 104 cause each of stacks 108(3) and 108(4) to each increase their respective output powers from 10,000 watts to 12,500 watts, such that battery still provides 40,000 watts to source/load 106. Thus, controller 104 enables simultaneous execution of the local operating strategy of operating stack 108(1) at a constant power of 5,000 watts while maintaining the global operating strategy of providing 40,000 watts to source/load 106.

Accordingly, controller 104 is configured to simultaneously execute (1) one or more local operating strategies for a battery 102, 902, or 1002 and (2) a global operating strategy for the battery. Such ability to simultaneously execute both types of operating strategies may achieve significant advantages. For example, a diagnostic test may be performed on one or more of stacks 108, maintenance may be performed on one or more stacks 108, a corrective action may be performed on one or more stacks 108, a safety action may be performed on one or more stacks 108, and/or an optimization action may be performed on one or more stacks 108, without interfering with operation of battery 102, 902, or 1002 with respect to source/load 106. Stated differently, voltage $v_{bat}$ and current $i_{bat}$ may be unaffected by execution of the local operating strategy, such that execution of the local operating strategy is imperceptible to source/load 106.

Furthermore, some embodiments of controller 104 are configured to execute a local operating strategy simultaneously with a global operating strategy of operating battery 102, 902, or 1002 in a standby mode, where the battery neither provides power to source/load 106 nor receives power from source/load 106. Controller 104 causes battery 102, 902, or 1002 to operate in a standby mode, for example, by mechanically disconnecting the battery from source/load 106 and/or by controlling power converters 110 or 1010 such that stacks 108 collectively do not sink or source power from source/load 106. Controller 104 is configured to control power converters 110 or 1010 under such conditions such that one stack 108 of a battery 102, 902, or 1002 may serve as a load or power source for another stack 108 of the same battery. For example, assume that battery 102 is operating in a standby mode, and controller 104 executes a local operating strategy with respect to stack 108(1) which requires charging stack 108(1). Source/load 106 does not provide power for charging stacks 108 while battery 102 is operating in the standby mode. Therefore, controller 104 may be configured to cause one or more of stacks 108(2)-108(4) to provide the power for charging stack 108(1) required by the local operating strategy for stack 108(1). As another example, assume that battery 102 is operating in a standby mode, and controller 104 executes a local operating strategy with respect to stack 108(1) which requires discharging stack 108(1). Source/load 106 does not receive power from battery 102 while the battery is operating in the standby mode. Therefore, controller 104 may be configured to cause one or more of stacks 108(2)-108(4) to receive power from discharging stack 108(1) while executing the local operating strategy for stack 108(1).

Figure 11:
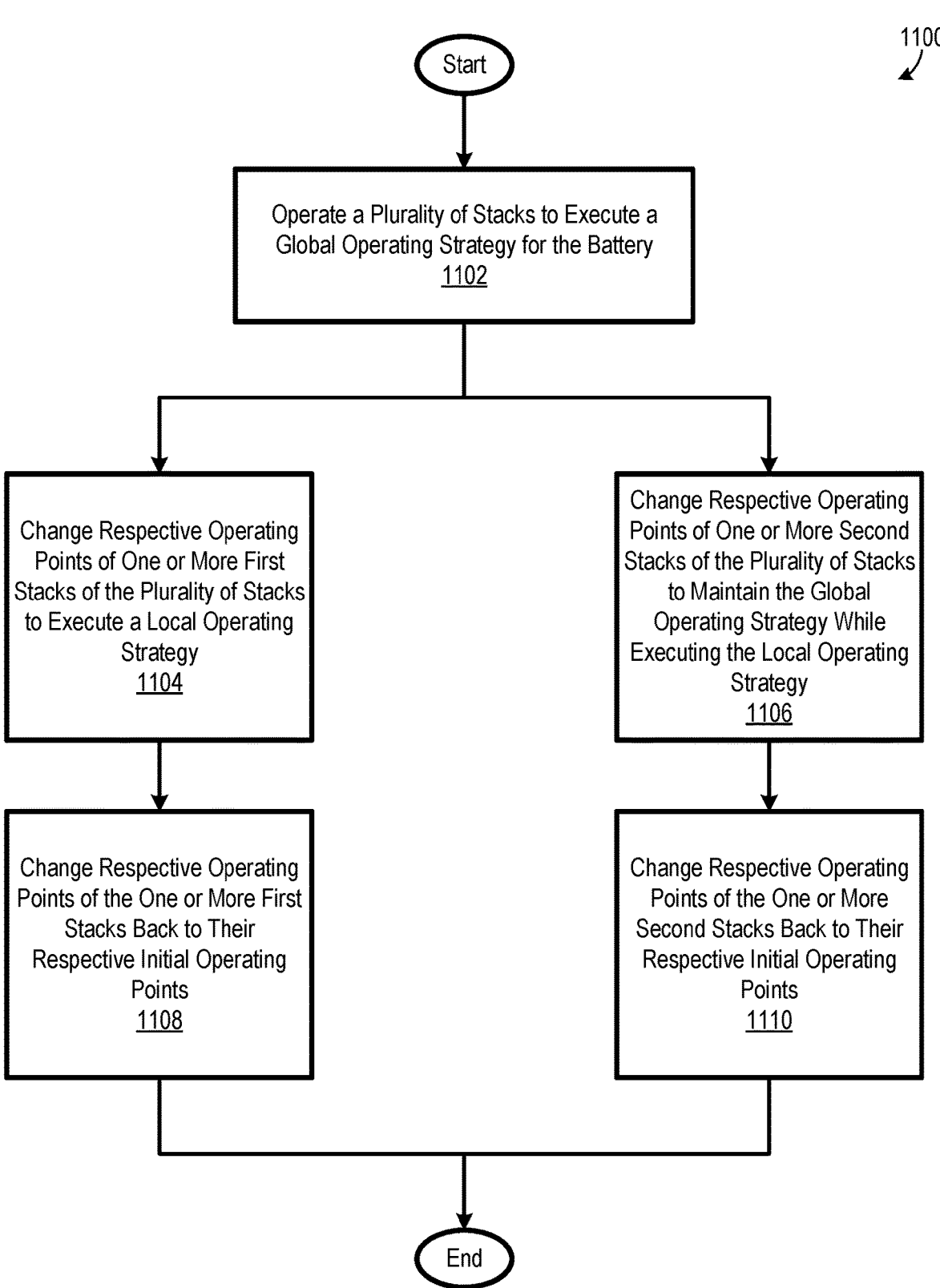
FIG. 11 is a flow chart of a method for managing a plurality of stacks of electrochemical cells, according to an embodiment.

FIG. 11 is a flow chart of a method 1100 for managing a plurality of stacks of electrochemical cells, where the stacks are electrically coupled in parallel in a battery. Method 1100 is executed by some embodiments of controller 104 to simultaneously execute a local operating strategy and a global operating strategy. In a block 1102 of method 1100, the stacks are operated to execute a global operating strategy of the battery. In one example of block 1102, controller 104 controls each of power converters 110(1)-110(4) of battery 102 such that stacks 108(1)-108(4) of battery 102 collectively provide a constant power of 100,000 watts to source/load 106. In another example, of block 1102, controller 104 controls each of power converters 110(1) and 110(2) of battery 1002 such that stacks 108(1)-108(4) of battery 902 collectively receive a constant power of 80,000 watts from source/load 106.

Blocks 1104 and 1106 of method 1100 are executed concurrently for a duration of a common first time period. In some embodiments, the first time period is predetermined, while in some other embodiments, the first time period is a function of one or more parameters. For example, in certain embodiments, the first time period corresponds to a time required to successfully execute the local operating strategy, such as time required to balance state of charge of stacks 108 or time required to achieve a desired difference in state of charge among stacks 108. In block 1104, respective operating points of one or more first stacks of the plurality of stacks are changed to execute a local operating strategy. In one example of block 1104, controller 104 controls power converter 110(4) of battery 102 to reduce a power contribution of stack 108(4) to source/load 106 by 10,000 watts. In another example of block 1104 of method 1100, controller 104 controls power converter 110(1) of battery 902 to increase a power collectively received by stacks 108(1) and 108(2) from source/load 106 by 5,000 watts.

In block 1106, respective operating points of one or more second stacks of the plurality of stacks are changed to maintain the global operating strategy of the battery while executing the local operating strategy in block 1104. In one example of block 1106, controller 104 controls power converter 110(2) of battery 102 to increase a power contribution of stack 108(2) by 10,000 watts to compensate for, i.e., to offset, the 10,000 watts decrease in the power contribution of stack 108(4) to source/load 106 resulting from executing the local operating strategy for battery 102. In another example of block 1106, controller 104 controls power converter 110(2) of battery 902 to decrease a collective power received by stacks 108(3) and 108(4) from source/load 106 by 5,000 watts to compensate for, i.e., to offset, the 5,000 watts increase in power collectively received by stacks 108(1) and 108(2) from source/load 106 resulting from executing the local operating strategy for battery 1002.

After expiration of the first time period, (a) method 1100 proceeds from block 1104 to a block 1108, and (b) method 1100 proceeds from block 1106 to a block 1110. In block 1108, operating points of the one or more first stack are changed from the modified operating points of block 1104 back to their respective initial operating points, i.e., their operating points in block 1102 before executing block 1104, to continue to pursue to the global operating strategy after completing execution of the local operating strategy. In one example of block 1108, controller 104 controls power converter 110(4) of battery 102 to increase a power contribution of stack 108(4) to source/load 106 by 10,000 watts, to reverse the change in operation of stack 108(4) made while executing the local operating strategy in block 1104. In another example of block 1108 of method 1100, controller 104 controls power converter 110(1) of battery 902 to decrease a power collectively received by stacks 108(1) and 108(2) from source/load by 5,000 watts, to reverse the change in operation of stacks 108(1) and 108(2) made while executing the local operating strategy in block 1104.

In block 1110, operating points of the one or more second stack are changed from their modified operating points of block 1106 back to their respective initial operating points, i.e., their operating points in block 1102 before executing block 1106. In one example of block 1110, controller 104 controls power converter 110(2) of battery 102 to decrease a power contribution of stack 108(2) by 10,000 watts, to reverse the change in operation of stack 108(2) made while compensating for the local operating strategy in block 1106. In another example of block 1110, controller 104 controls power converter 110(2) of battery 902 to increase a power collectively received by stacks 108(3) and 108(4) from source/load 106 by 5,000 watts, to reverse the change in operation of stacks 108(3) and 108(4) made while compensating for the local operating strategy in block 1106.

Figure 12:
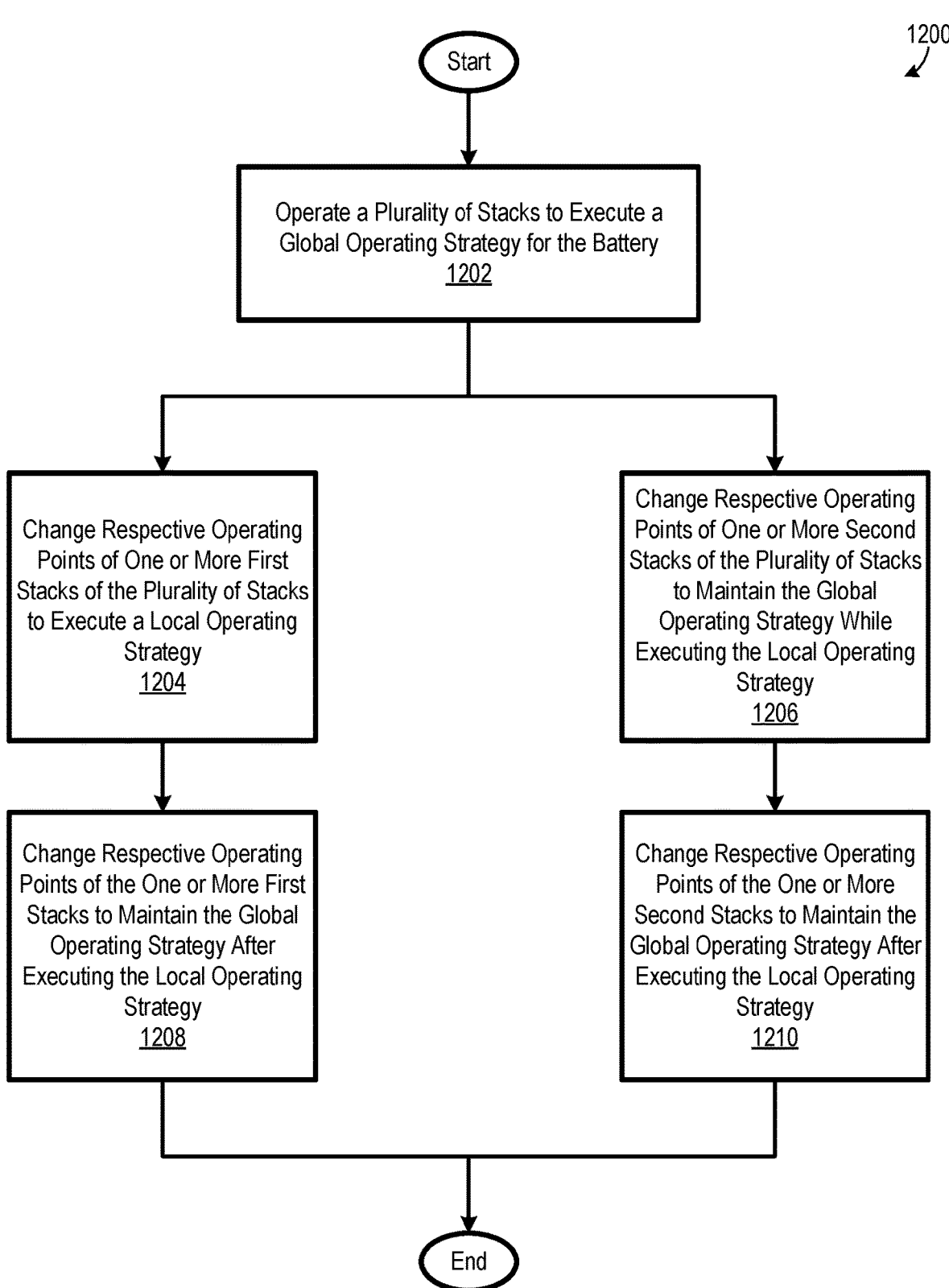
FIG. 12 is a flow chart of an alternate embodiment of the FIG. 11 method.

FIG. 12 is a flow chart of a method 1200 for managing a plurality of stacks of electrochemical cells, where the stacks are electrically coupled in parallel in a battery. Method 1200 is an alternate embodiment of method 1100 where stack 108 operating points after execution of a local operating strategy are different from stack 108 operating points before execution of the local operating strategy. In a block 1202 of method 1200, the stacks are operated to execute a global operating strategy of the battery. In one example of block 1202, controller 104 controls each of power converters 110(1)-110(4) of battery 102 such that respective states of charge of stacks 108(1)-108(4) are substantially the same while discharging the stacks to provide a constant power of 40,000 watts to source/load 106.

Blocks 1204 and 1206 of method 1200 are executed concurrently for a duration of a common first time period. The first time period is, for example, a predetermined time period or a time period that is a function of one or more parameters. In block 1204, respective operating points of one or more first stacks of the plurality of stacks are changed to execute a local operating strategy. In one example of block 1204, controller 104 controls power converter 110(1) of battery 102 to cause stack 108(1) to operate in an open circuit mode, such as to perform a diagnostic test on stack 108(1). In block 1206, respective operating points of one or more second stacks of the plurality of stacks are changed to maintain the global operating strategy of the battery while executing the local operating strategy in block 1204. In one example of block 1206, controller 104 controls each of power converters 110(2)-110(4) of battery 102 to increase a collective power contribution of stacks 108(2)-108(4) to source/load 106 to compensate for stack 108(1) operating in the open circuit mode, such that respective states of charge of stacks 108(2)-108(4) remain substantially the same while the stacks discharge to collectively provide 40,000 watts to source/load 106.

The local operating strategy is completed after expiration of the first time period, and in response, (a) method 1200 proceeds from block 1204 to a block 1208, and (b) method 1200 proceeds from block 1206 to a block 1210. In block 1208, operating points of the one or more first stacks are changed from the operating points of block 1204 to respective operating points that maintain the global operating strategy after completion of execution of the local operating strategy. In one example of block 1208, controller controls power converter 110(1) to cause a state of charge of stack 108(1) to change to a value that is substantially similar to respective states of charge of stacks 108(2)-108(4), while all stacks 108 of battery 102 discharge to collectively provide 40,000 watts to source/load 106.

In block 1210, operating points of one or more second stacks are changed to maintain the global operating strategy after completion of execution of the local operating strategy. In one example of block 1210, controller 104 controls each of power converters 110(2)-110(4) of battery 102 to so that their respective states of charge are substantially the same while all stacks 108 of battery 102 discharge to collectively provide 40,000 watts to source/load 106.

Discussed below with respect to Examples B1-B7 are several example scenarios where controller 104 executes a local operating strategy and a global operating strategy. It is understood, though, that controller 104 may be configured to execute additional and/or alternative local and global operating strategies, as well as to execute operating strategies for reasons different than those discussed below, without departing from the scope hereof.

Example B1

Figure 13:
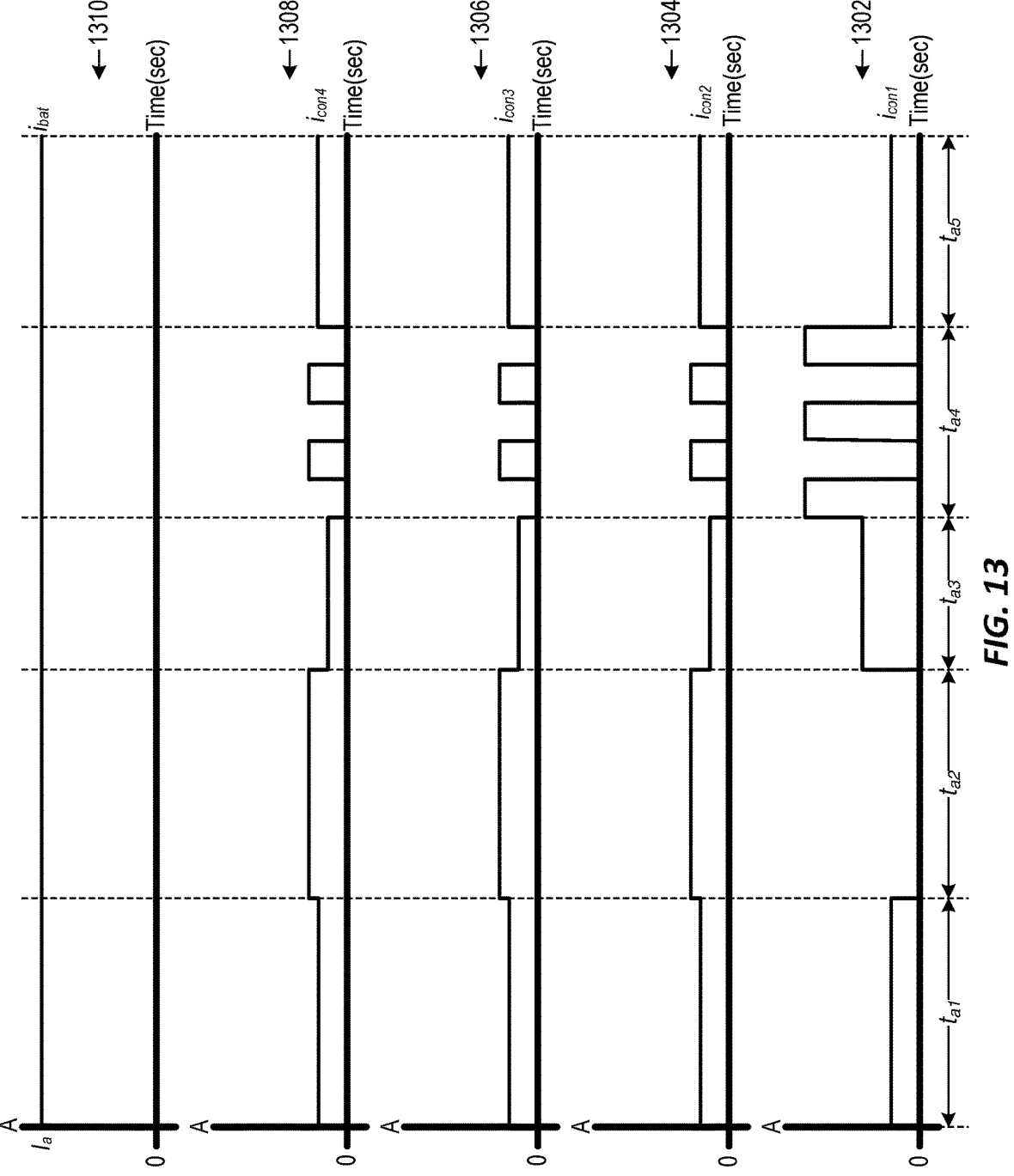
FIG. 13 illustrates an example operating scenario of an embodiment of the FIG. 1 energy storage system.

FIG. 13 includes five graphs 1302, 1304, 1306, 1308, and 1310 of current magnitude in amperes (A) versus time in seconds (sec) illustrating an example operating scenario of an embodiment of energy storage system 100. The vertical axes of graphs 1302, 1304, 1306, 1308, and 1310 may represent either absolute current magnitude or root-mean-square (RMS) current magnitude, such as depending on whether the corresponding currents are DC currents or AC currents. Graphs 1302, 1304, 1306, 1308, and 1310 share a common time base, and graphs 1302, 1304, 1306, 1308, and 1310 include curves representing $i_{con1}$, $i_{con2}$, $i_{con3}$, $i_{con4}$, and $i_{bat}$, respectively. During a time period $t_{a1}$, controller 104 executes a global operating strategy of providing a constant current of magnitude $I_a$ to source/load 106, as illustrated in graph 1310. Additionally, stacks 108(1)-108(4) equally share load current $i_{bat}$, i.e., each stack 108 provides a current $i_{con}$ via its respective power converter 110 that is one fourth of current $i_{bat}$, as illustrated in graphs 1302-1308. Controller 104 does not execute a local operating strategy during time period $t_{a1}$.

During time period $t_{a2}$, controller 104 executes a local operating strategy with respect to stack 108(1) by causing the stack to operate in an open circuit mode, such as to measure open circuit voltage of stack 108(1) or to measure leakage current of stack 108(1). Consequently, stack 108(1) does not contribute to load current $i_{bat}$, as shown in graph 1302 by current $i_{con1}$ being zero during time period $t_{a2}$. However, controller 104 controls each of stacks 108(2)-8(4) to increase their respective current contributions $i_{con2}$, $i_{con3}$, and $i_{con4}$ during time period $t_{a2}$ to compensate for stack 108(1) not contributing to current $i_{bat}$, such that current $i_{bat}$ remains equal to $I_a$ during time period $t_{a2}$, as shown in graphs 1304-1310. Accordingly, controller 104 maintains the global operating strategy of providing a constant current of magnitude $I_a$ to source/load 106 while executing the local strategy where stack 108(1) operates in an open circuit mode.

During time period tai, controller 104 executes a different local operating strategy with respect to stack 108(1) by causing the stack to operate in a constant current mode where current contribution $i_{con1}$ from stack 108(1) has a larger current magnitude than required for stack 108(1) to equally share load current $i_{bat}$, such as to help measure impedance of stack 108(1). Controller 104 simultaneously controls stacks 108(2)-108(4) to lower the magnitudes of their respective current contributions $i_{con2}$, $i_{con3}$, and $i_{con4}$ such that current $i_{bat}$ remains equal to $I_a$. As such, controller 104 maintains the global operating strategy of providing a constant current of magnitude $I_a$ to source/load 106 while executing the local operating strategy where stack 108(1) operates in a constant current mode with a relatively large current contribution $i_{con1}$.

During time period $t_{a4}$, controller 104 executes another local operating strategy with respect to stack 108(1) by causing the stack to switch between a positive current state and a zero current state, as shown in graph 1302, such as to perform a galvanostatic intermittent titration technique (GITT) diagnostic test on stack 108(1). Controller 104 simultaneously controls stacks 108(2)-108(4) to change the magnitudes of their respective current contributions $i_{con2}$, $i_{con3}$, and $i_{con4}$ such that current $i_{bat}$ remains equal to $I_a$. Therefore, controller 104 maintains the global operating strategy of providing a constant current of magnitude $I_a$ to source/load 106 while executing the local strategy where stack 108(1) switches between current magnitudes. Finally, controller 104 does not execute a local operating strategy during period time $t_{a5}$, but controller 104 continues to execute the global operating strategy of providing a constant current of magnitude $I_a$ to source/load 106.

The curves of the FIG. 13 graphs could alternatively represent power versus time, instead of current versus time, with appropriate changes to the scales and units of the vertical axes of the graphs. For example, (1) the curve of graph 1302 could alternately represent power $p_{con1}$ provided by stack 108(1) to source/load 106, (2) the curve of graph 1304 could alternately represent power $P_{con2}$ provided by stack 108(2) to source/load 106, (3) the curve of graph 1306 could alternately represent power $P_{con3}$ provided by stack 108(3) to source/load 106, (4) the curve of graph 1308 could alternately represent power $p_{con4}$ provided by stack 108(4) to source/load 106, and (5) the curve of graph 1310 could alternately represent power $p_{bat}$ provided by battery 102 to source/load 106.

Example B2

Figure 14:
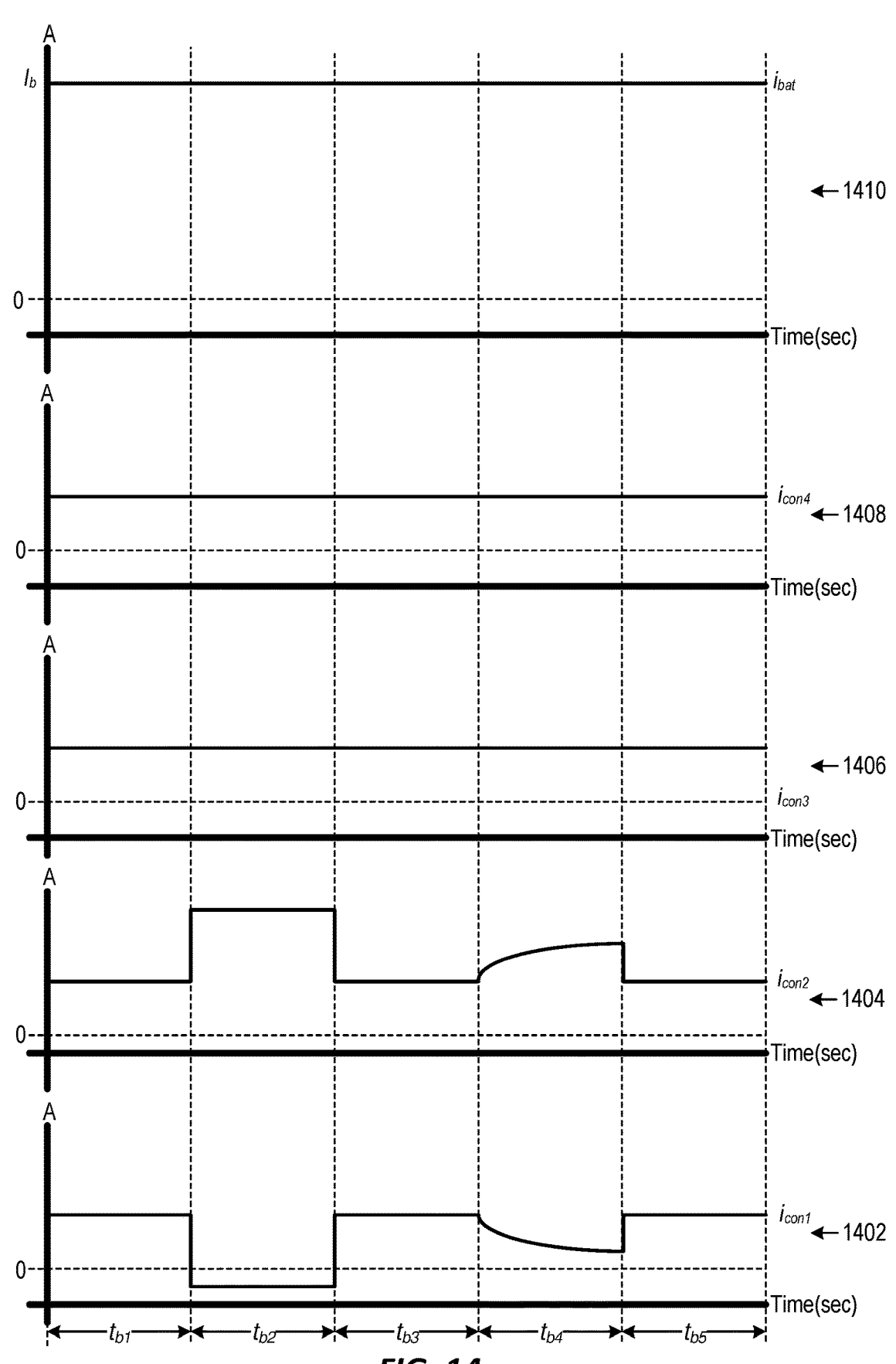
FIG. 14 illustrates another example operating scenario of an embodiment of the FIG. 1 energy storage system.

FIG. 14 includes five graphs 1402, 1404, 1406, 1408, and 1410 of current magnitude in amperes versus time in seconds illustrating another example operating scenario of an embodiment of energy storage system 100. The vertical axes of graphs 1402, 1404, 1406, 1408, and 1410 may represent either absolute current magnitude or RMS current magnitude, such as depending on whether the corresponding currents are DC currents or AC currents. Graphs 1402, 1404, 1406, 1408, and 1410 share a common time base, and graphs 1402, 1404, 1406, 1408, and 1410 include curves representing $i_{con1}$, $i_{con2}$, $i_{con3}$, $i_{con4}$, and $i_{bat}$, respectively. During a time period $t_{b1}$, controller 104 executes a global operating strategy of providing a constant current of magnitude $I_b$ to source/load 106, as illustrated in graph 1410. Additionally, stacks 108(1)-108(4) equally share load current $I_{bat}$, as illustrated in graphs 1402-1408 by each stack providing a respective current $i_{con}$ that is one fourth of current $i_{bat}$. Controller 104 does not execute a local operating strategy during time period $t_{b1}$.

During time period $t_{b2}$, controller 104 executes a local operating strategy for stack 108(1) by causing it switch from a discharging mode to a charging mode, as shown in graph 1402 by current $i_{con1}$ being negative during time period $t_{b2}$. Controller 104 simultaneously causes stack 108(2) to increase magnitude of its current contribution $i_{con2}$ during time period $t_{b2}$ to offset the change to current contribution $i_{con1}$ during this time period, as shown in graph 1404, so that current $i_{bat}$ remains at $I_{b2}$ and the global operating strategy is maintained. Controller 104 continues to execute the global operating strategy during time period $t_{b3}$, but controller 104 does not execute a local operating strategy during this time period.

During time period $t_{b4}$, controller 104 executes another local operating strategy for stack 108(1) by causing it switch from a constant current/power mode to a constant voltage mode where voltage $v_{s1}$ across stack 108(1) is constant, such as to help perform a diagnostic test on stack 108(1). As a result, current contribution $i_{con1}$ from stack 108(1) to current $i_{bat}$ continuously drops during time period $t_{b4}$, as shown in graph 1402. Controller 104 simultaneously causes current $I_{con2}$ contributed by stack 108(2) to increase during time period $t_{b4}$ in a manner that compensates for the decrease in current $i_{con1}$ of stack 108(1), as shown in graph 1404. Therefore, current $i_{bat}$ remains at $I_b$ during time period $t_{b4}$ and the global operating strategy is maintained. Controller 104 continues to execute the global operating strategy during time period $t_{b5}$, but controller 104 does not execute a local operating strategy during this time period.

The curves of the FIG. 14 graphs could alternatively represent power versus time, instead of current versus time, with appropriate changes to the scales and units of the vertical axes of the graphs. For example, (1) the curve of graph 1402 could alternately represent power $p_{con1}$ provided by stack 108(1) to source/load 106, (2) the curve of graph 1404 could alternately represent power $p_{con2}$ provided by stack 108(2) to source/load 106, (3) the curve of graph 1406 could alternately represent power $p_{con3}$ provided by stack 108(3) to source/load 106, (4) the curve of graph 1408 could alternately represent power $p_{con4}$ provided by stack 108(4) to source/load 106, and (5) the curve of graph 1410 could alternately represent power $p_{bat}$ provided by battery 102 to source/load 106.

Example B3

Figure 15:
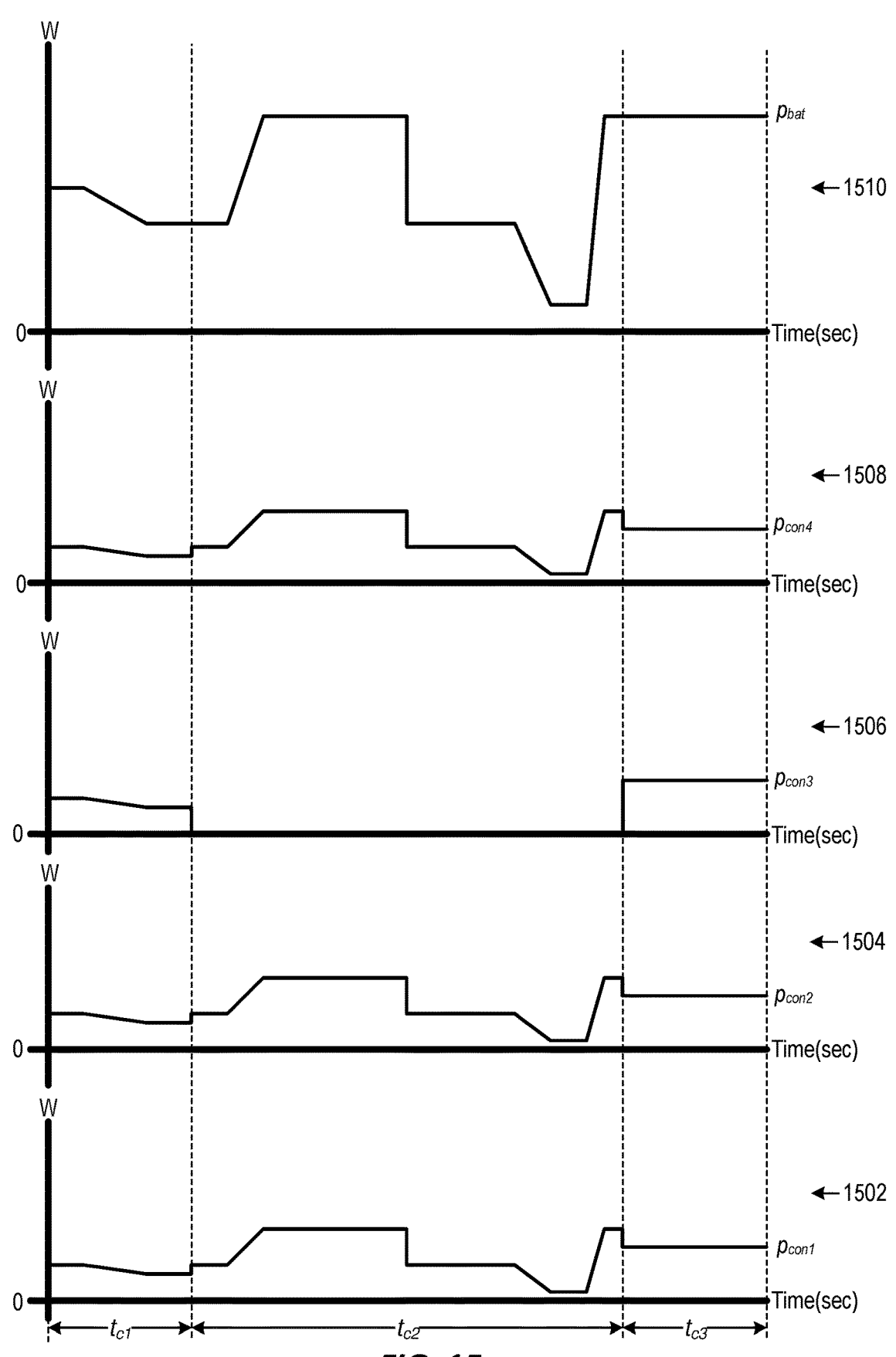
FIG. 15 illustrates another example operating scenario of an embodiment of the FIG. 1 energy storage system.

FIG. 15 includes five graphs 1502, 1504, 1506, 1508, and 1510 of power magnitude in watts (W) versus time in seconds illustrating another example operating scenario of an embodiment of energy storage system 100. Graphs 1502, 1504, 1506, 1508, and 1510 share a common time base, and graphs 1502, 1504, 1506, 1508, and 1510 includes curves representing $p_{con1}$, $p_{con2}$, $p_{con3}$, $p_{con4}$, and $p_{bat}$, respectively. As discussed above, $p_{con1}$, $p_{con2}$, $p_{con3}$, and $P_{con4}$ represent respective power contributions of stacks 108(1), 108(2), 108(3), and 108(4) to power $p_{bat}$, and power $p_{bat}$ represents power supplied by battery 102 to source/load 106.

Controller 104 executes a global operating strategy in the FIG. 15 example of providing a constant voltage $v_{bat}$ (not shown in FIG. 15) to source/load 106 during each of time periods $t_{c1}$, $t_{c2}$, and $t_{c3}$. Power consumed by source/load 106 is irregular in this example, as evident by the irregular curve of $p_{bat}$ in graph 1410. Controller 104 does not execute a local operating strategy in time periods $t_{c1}$ and $t_{c3}$ and controller 104 controls stacks 108(1)-108(4) so that each stack contributes one fourth of power $p_{bat}$ supplied by battery 102 to source/load 106, as illustrated in graphs 1502-1508, in time periods $t_{c1}$ and $t_{c3}$. However, controller 104 executes a local operating strategy for stack 108(3) in time period $t_{c2}$ by causing stack 108(3) to operate in an open circuit mode, as evident by stack power contribution $p_{con3}$ being zero during time period $t_{c2}$. Additionally, controller 104 causes each of stacks 108(1), 108(2), and 108(4) to compensate for stack 108(3) operating in the open circuit mode in time period $t_{c2}$ by causing stacks 108(1), 108(2), and 108(4) to collectively provide total power $p_{bat}$ to source/load 106, thereby maintaining the global operating strategy of battery 102 during time period $t_{c2}$.

The curves of the FIG. 15 graphs could alternatively represent current versus time, instead of power versus time, with appropriate changes to the scales and units of the vertical axes of the graphs. For example, (1) the curve of graph 1502 could alternately represent current $i_{con1}$ provided by stack 108(1) to source/load 106, (2) the curve of graph 1504 could alternately represent current $i_{con2}$ provided by stack 108(2) to source/load 106, (3) the curve of graph 1506 could alternately represent current $i_{con3}$ provided by stack 108(3) to source/load 106, (4) the curve of graph 1508 could alternately represent current $I_{con4}$ provided by stack 108(4) to source/load 106, and (5) the curve of graph 1510 could alternately represent current $i_{bat}$ provided by battery 102 to source/load 106.

Example B4

Figure 16:
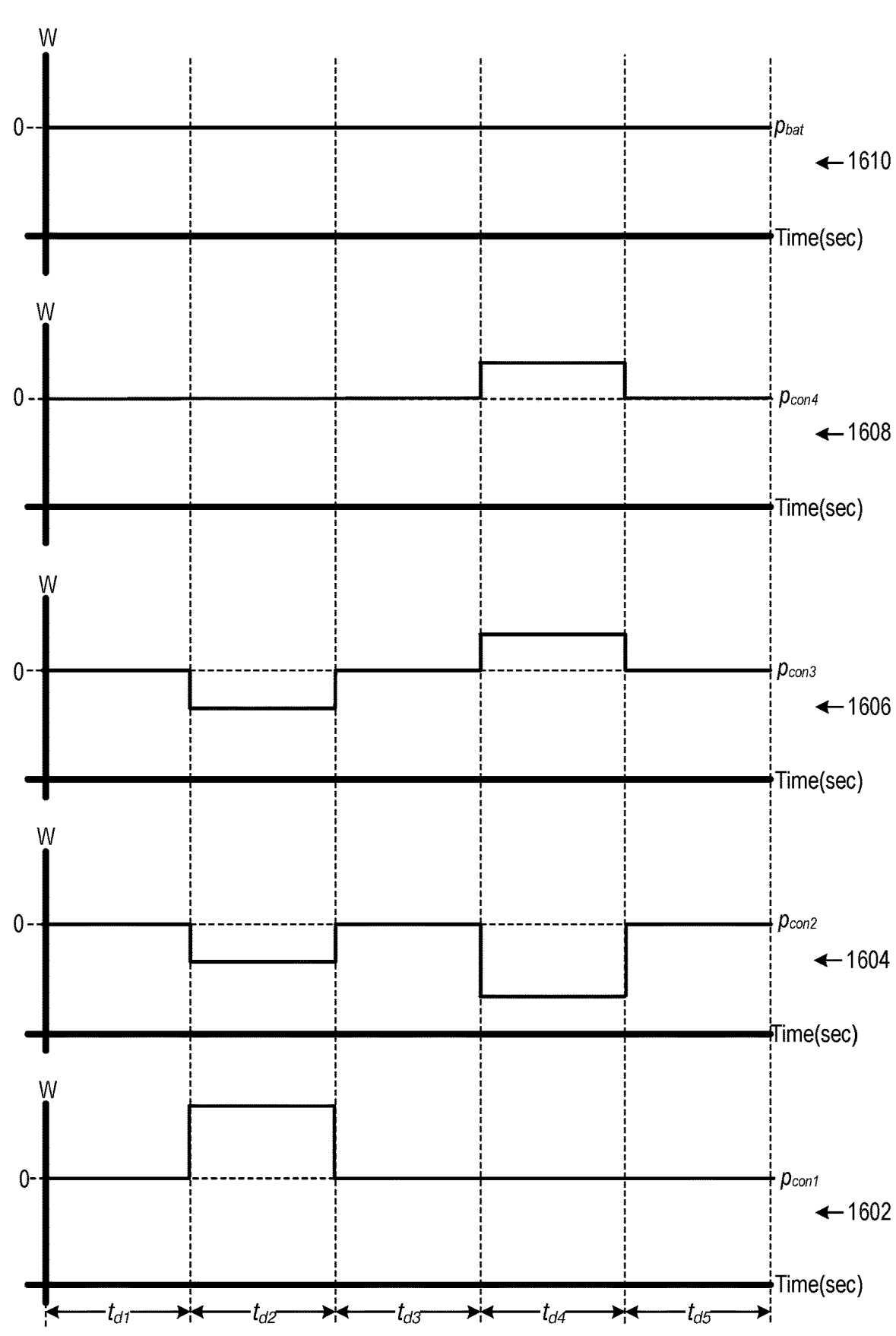
FIG. 16 illustrates another example operating scenario of an embodiment of the FIG. 1 energy storage system.

FIG. 16 includes five graphs 1602, 1604, 1606, 1608, and 1610 of power magnitude in watts versus time in seconds illustrating another example operating scenario of an embodiment of energy storage system 100. Graphs 1602, 1604, 1606, 1608, and 1610 share a common time base, and graphs 1602, 1604, 1606, 1608, and 1610 includes curves representing $p_{con1}$, $p_{con2}$, $p_{con3}$, $p_{con4}$, and $p_{bat}$, respectively. Controller 104 executes a global operating strategy of operating in a standby mode where battery 102 neither provides electrical power to source/load 106 nor receives electrical power from source load 106, as shown by $p_{bat}$ being zero in graph 1610 across time periods $t_{d1}$ through $t_{d5}$. Additionally, controller 104 does not execute a local operating strategy in any of time periods $t_{d1}$, $t_{d3}$, and $t_{d5}$.

Controller 104 executes a local operating strategy for stack 108(1) during time period to by causing the stack to operate in a discharge mode at a constant power level, such as to perform a diagnostic test on stack 108(1), as illustrated in graph 1602. Source/load 106 cannot receive the power discharged from stack 108(1) due to battery 102 operating in a standby mode. However, controller 104 controls each of stacks 108(2) and 108(3) to operate in a charging mode during time period to such that stacks 108(2) and 108(3) collectively receive all power discharged from stack 108(1), to maintain the global operating strategy of operating battery 102 in a standby mode.

Additionally, controller 104 executes a local operating strategy for stack 108(2) during time period $t_{d4}$ by causing the stack to operate in a charge mode at a constant power level, such as to perform a diagnostic test on stack 108(2), as illustrated in graph 1604. Controller 104 controls each of stacks 108(3) and 108(4) to operate in a discharging mode during time period $t_{d4}$ such that stacks 108(3) and 108(4) collectively provide all power absorbed by stack 108(2), to maintain the global operating strategy of operating battery 102 in a standby mode during time period $t_{d4}$.

Accordingly, stacks 108(2) and 108(3) absorb the power provided by stack 108(1) during time period to by receiving this power from stack 108(1), and stacks 108(3) and 108(4) provide the power absorbed by stack 108(2) during time period $t_{d4}$. Consequently, while there is power transfer between stacks in the FIG. 16 example, there is no power transfer between battery 102 and/source load 106 in this example. In some alternate embodiments, controller 104 further controls power converters 110(1)-110(4) to balance state of charge of stacks 108(1)-108(4) in time period $t_{d3}$ and/or time period $t_{d5}$, such as to offset charge shifting among stacks 108 that occurs during time periods $t_{d2}$ and $t_{d4}$.

The curves of the FIG. 16 graphs could alternatively represent current versus time, instead of power time, with appropriate changes to the scales and units of the vertical axes of the graphs. For example, (1) the curve of graph 1602 could alternately represent current $i_{con1}$ provided by stack 108(1) to source/load 106, (2) the curve of graph 1604 could alternately represent current $i_{con2}$ provided by stack 108(2) to source/load 106, (3) the curve of graph 1606 could alternately represent current $i_{con3}$ provided by stack 108(3) to source/load 106, (4) the curve of graph 1608 could alternately represent current $i_{con4}$ provided by stack 108(4) to source/load 106, and (5) the curve of graph 1610 could alternately represent current $i_{bat}$ provided by battery 102 to source/load 106.

Example B5

Figure 17:
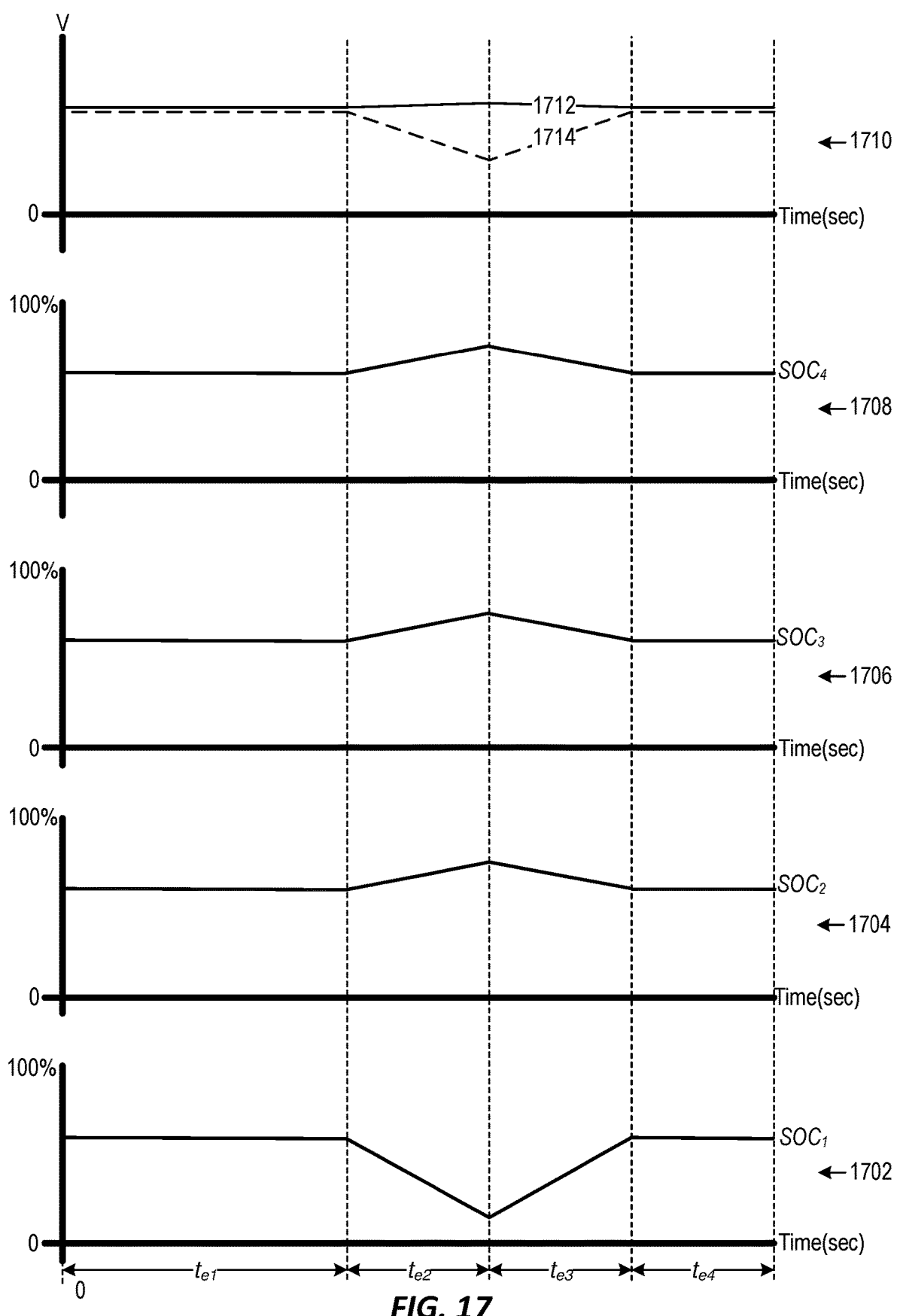
FIG. 17 illustrates another example operating scenario of an embodiment of the FIG. 1 energy storage system.

FIG. 17 includes five graphs 1702, 1704, 1706, 1708, and 1710 illustrating another example operating scenario of an embodiment of energy storage system 100. Graphs 1702, 1704, 1706, and 1708 are graphs of state of charge (SOC) verses time for stacks 108(1), 108(2), 108(3) and 108(4), respectively, and graph 1710 is a graph of voltage (V) verses time for each of stacks 108(1)-108(4). Curves $SOC_1$, $SOC_2$, $SOC_3$, and $SOC_4$ represent state of charge of stacks 108(1), 108(2), 108(3), and 108(4), respectively. Voltage $v_{s2}$, $v_{s3}$, and $v_{s4}$ across stacks 108(2), 108(3), and 108(4), respectively, are substantially the same in the FIG. 17 example, and these voltages are therefore represented by a common curve 1712 in graph 1710. Voltage $v_{s1}$ across stack 108(1) is represented by a dedicated curve 1714 in FIG. 17.

Controller 104 executes a global operating strategy of maintaining an overall state of charge of battery 102 at a constant level during each of time periods $t_{e1}$, $t_{e2}$, $t_{e3}$, and $t_{e4}$. Controller 104 does not execute a local operating strategy during time period $t_{e1}$ or during time period $t_{e4}$. During time period $t_{e2}$, controller 104 executes a local operating strategy of causing state of charge of stack 108(1) to move to a lower value than respective states of charge of stacks 108(2), 108(3), and 108(4), such as to perform a diagnostic test on stack 108(1), to perform maintenance on stack 108(1), or to perform state of charge recalibration of stack 108(1). For example, in an embodiment where stack 108(1) includes LFP electrochemical cells, it may be desirable to decrease state of charge of stack 108(1) while performing a diagnostic test on the stack so that the stack is not operating in a "flat region," where voltage $v_{s1}$ across the stack is insensitive to changes in stack state of charge. Controller 104 causes each of stacks 108(2), 108(3), and 108(4) to move toward a higher state of charge during time period $t_{e2}$ to compensate for stack 108(1) moving toward the lower state of charge, such that overall state of charge of battery 102 remains constant and the global operating strategy is thereby maintained. Voltage $v_{s4}$ across stack 108(1) significantly decreases during time period $t_{e2}$, while each of respective voltages $v_{s2}$, $v_{s3}$, and $v_{s4}$ across stacks 108(2), 108(3), and 108(4) just slightly increases during time period $t_{e2}$, as illustrated in graph 1710.

Controller 104 causes state of charge of stack 108(1) to return to its steady state value in time period $t_{e3}$ such that the state of charge of stack 108(1) is substantially equal to respective states of charge of stacks 108(2), 108(3), and 108(4) at the end of time period $t_{e3}$. Controller 104 also causes each of stacks 108(2), 108(3), and 108(4) to provide energy to stack 108(1) to raise its state of charge to a value that is substantially similar to respective states of charge of stacks 108(2), 108(3), and 108(4), causing states of charge of stacks 108(2), 108(3), and 108(4) to decrease.

Example B6

Figure 18:
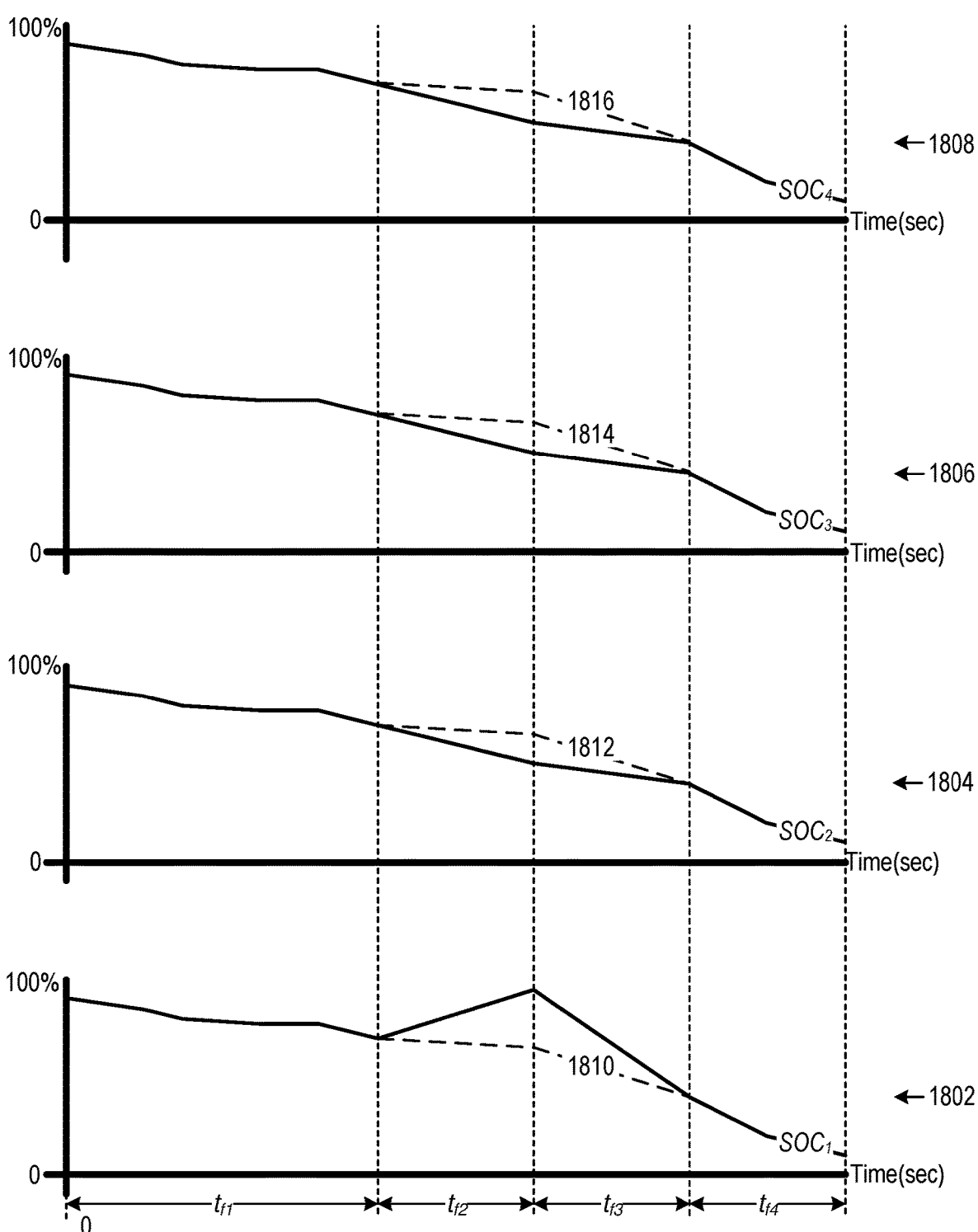
FIG. 18 illustrates another example operating scenario of an embodiment of the FIG. 1 energy storage system.

FIG. 18 includes four graphs 1802, 1804, 1806, and 1808 illustrating another example operating scenario of an embodiment of energy storage system 100. Graphs 1802, 1804, 1806, and 1808 are graphs of state of charge verses time for stacks 108(1), 108(2), 108(3) and 108(4), respectively. Curves $SOC_1$, $SOC_2$, $SOC_3$, and $SOC_4$ represent state of charge of stacks 108(1), 108(2), 108(3), and 108(4), respectively. As discussed below, controller 104 executes a local operating strategy in each of time periods $t_{f2}$ and $t_{f3}$. FIG. 18 further includes curves 1810, 1812, 1814, and 1816 illustrating what would be states of charge of stacks 108(1), 108(2), 108(3), and 108(4), respectively, if controller 104 did not execute the local operating strategies in time periods $t_{f2}$ and $t_{f3}$.

The graphs of FIG. 18 depict an example discharge cycle of battery 102 where controller 104 executes a global operating strategy of maintaining a constant voltage $v_{bat}$ (not shown in FIG. 18) during the discharge cycle. Source/load 106 presents a varying load in this example such that stacks 108 discharge in an irregular manner, as illustrated in FIG. 18. Controller 104 does not execute a local operating strategy during time period $t_{f1}$ or during time period $t_{f4}$. During time period $t_{f2}$, controller 104 executes a local operating strategy of causing state of charge of stack 108(1) to move to a higher value than respective states of charge of stacks 108(2), 108(3), and 108(4), such as to perform a diagnostic test on stack 108(1), to perform maintenance on stack 108(1), or to perform state of charge recalibration of stack 108(1). Controller 104 causes each of stacks 108(2), 108(3), and 108(4) to provide the energy required by stack 108(1) during time period $t_{f2}$, such that $V_{bat}$ remains constant during time period $t_{f2}$ and the global operating strategy is thereby maintained.

Controller 104 causes state of charge of stack 108(1) to return to its steady state value in time period $t_{f3}$ such that the state of charge of stack 108(1) is substantially equal to respective states of charge of stacks 108(2), 108(3), and 108(4) at the end of time period $t_{f3}$. Controller 104 also decreases rate of discharge of stacks 108(2), 108(3), and 108(4) to compensate for increased rate of discharge of stack 108(1), such that $V_{bat}$ remains constant and the global operating strategy is thereby maintained.

Example B7

Figure 19:
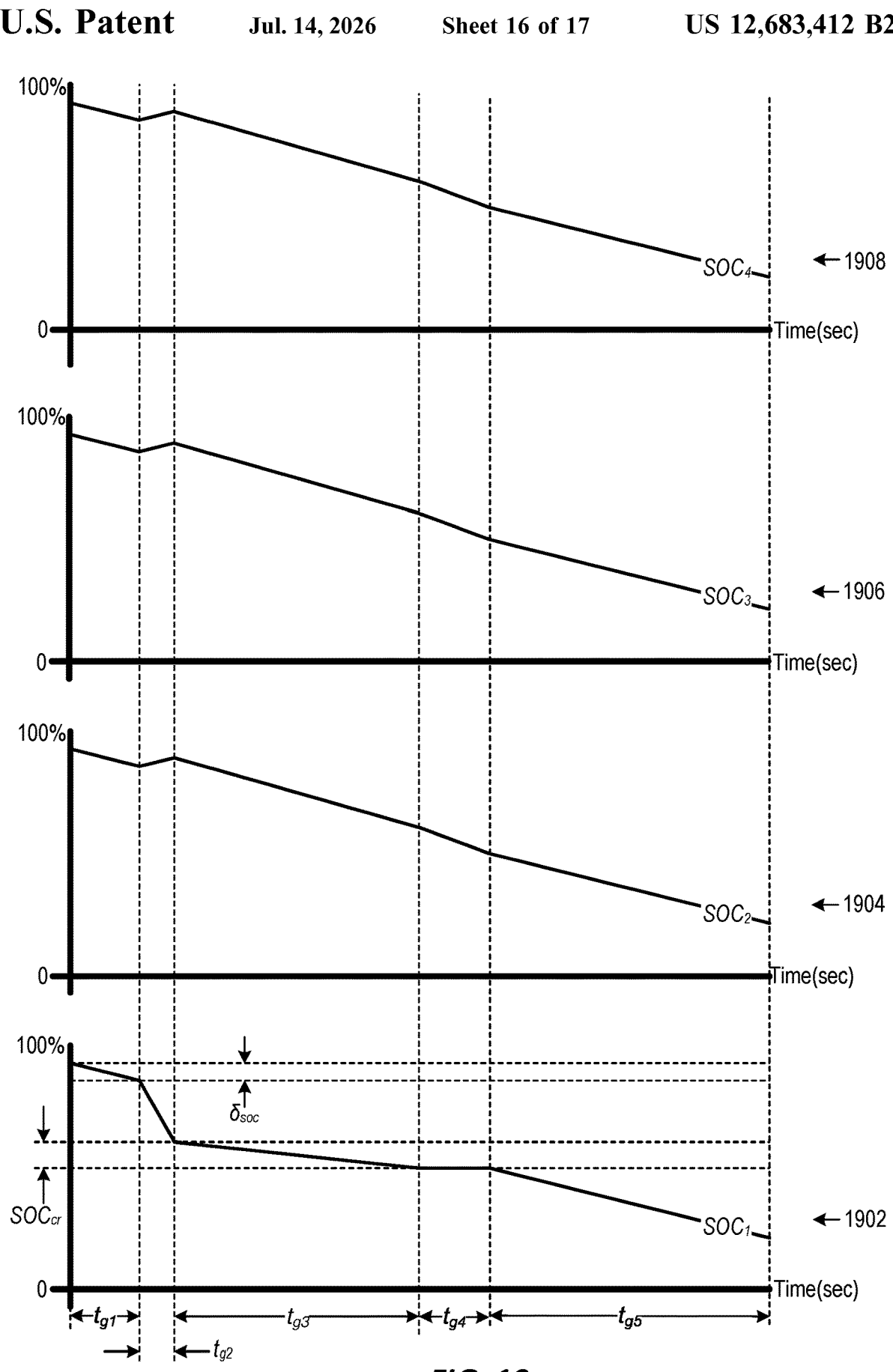
FIG. 19 illustrates another example operating scenario of an embodiment of the FIG. 1 energy storage system.

FIG. 19 includes four graphs 1902, 1904, 1906, and 1908 illustrating yet another example operating scenario of an embodiment of energy storage system 100. Graphs 1902, 1904, 1906, and 1908 are graphs of state of charge verses time for stacks 108(1), 108(2), 108(3) and 108(4), respectively. Curves $SOC_1$, $SOC_2$, $SOC_3$, and $SOC_4$ represent state of charge of stacks 108(1), 108(2), 108(3), and 108(4), respectively. The graphs of FIG. 19 depict an example discharge cycle of battery 102 where controller 104 executes a global operating strategy of maintaining a constant overall discharge rate of $\delta_{soc}/t_{g1}$ (see graph 1902) of battery 102 during the discharge cycle. Controller 104 does not execute a local operating strategy during time period $t_{g1}$ or during time period $t_{g5}$.

Stack 108(1) has critical state of charge range $SOC_{cr}$ (see graph 1902) that it is desirable to traverse at a lower rate discharge than $\delta_{soc}/t_{g1}$, such as to prolong the life of stack 108(1). Therefore, controller 104 is configured to execute local operating strategies to cause stack 108 to traverse state of charge range $SOC_{cr}$ at a relatively slow rate. Specifically, controller 104 executes a local operating strategy for stack 108(1) during time period $t_{g2}$ by increasing rate of discharge of stack 108(1) so that $SOC_1$ reaches the top boundary of state of charge range $SOC_{cr}$. Controller 104 also decreases rate of discharge of each of stacks 108(2), 108(3), and 108(4) during time period $t_{g2}$ so that the overall discharge rate of battery 102 remains at $\delta_{soc}/t_{g1}$, thereby maintaining the global operating strategy.

Controller 104 executes a different local operating strategy for stack 108(1) in time period $t_{g3}$ by causing stack 108(1) to discharge at a slow rate so that stack 108(1) traverses state of charge range $SOC_{cr}$ t a relatively slow rate. Controller 104 also adjusts discharge rates of stacks 108(2), 108(3), and 108(4) during time period $t_{g2}$ so that the overall discharge rate of battery 102 remains at $\delta_{soc}/t_{g1}$, thereby maintaining the global operating strategy. It should be noted that discharge rates of stacks 108(2), 108(3), and 108(4) during time period $t_{g2}$ are negative, i.e., the stacks are receiving power instead of providing power, due to the sharp increase in discharge rate of stack 108(1) during time period $t_{g2}$. In alternate embodiments where discharge rate of stack 108(1) during time period $t_{g2}$ is less sharp, discharge rates of stacks 108(2), 108(3), and 108(4) during time period $t_{g2}$ may decrease relative to time period $t_{g1}$ while remaining positive.

Figure 20:
FIG. 20 is a graph illustrating overall battery state of charge versus time in the FIG. 19 example operating scenario.

Stack 108(1) completes traversing state of charge range $SOC_{cr}$ at the end of time period $t_{g3}$. Consequently, controller 104 executes another local operating strategy in time period $t_{g4}$ by causing stack 108(1) to operate in an idle state and wait for stacks 108(2), 108(3), and 108(4) to reach the same state of charge as stack 108(1). Controller 104 also increases rate of discharge of stacks 108(2), 108(3), and 108(4) so that overall discharge rate of battery 102 remains at $\delta_{soc}/t_{g1}$ during time period $t_{g4}$, thereby maintaining the global operating strategy. All stacks 108(1)-108(4) have substantially the same state of charge at the beginning to time period $t_{g5}$, and controller 104 accordingly continues to execute the global operating strategy of discharging battery 102 at discharge rate $\delta_{soc}/t_{g1}$ without executing a local operating strategy. FIG. 20 is a graph 2000 illustrating an overall state of charge $SOC_T$ of battery 102 during time periods $t_{g1}$-$t_{g5}$ of the FIG. 19 example. As evident from FIG. 20, overall discharge rate of battery 102 remains constant during time periods $t_{g1}$-$t_{g5}$, despite variations in state of charge among stacks 108 during time periods $t_{g2}$, $t_{g3}$, and $t_{g4}$.

The example operating scenario of FIG. 19 could be modified to execute a respective local operating strategy for each of stacks 108(1)-108(4) at a different respective time during the discharge cycle, such as to enable each of the stacks to traverse a respective critical state of charge range at a relatively slow rate in a manner analogous that discussed above with respect to stack 108(1).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for managing a plurality of stacks of electrochemical cells, the plurality of stacks being electrically coupled in parallel in a battery, the method comprising:

operating the plurality of stacks to execute a global operating strategy of the battery;

changing respective operating points of one or more first stacks of the plurality of stacks to execute a local operating strategy;

changing respective operating points of one or more second stacks of the plurality of stacks to maintain the global operating strategy of the battery while executing the local operating strategy; and after completing execution of the local operating strategy, further changing the respective operating points of the one or more first stacks to compensate for change in the state of charge of the one or more first stacks caused by executing the local operating strategy.

2. The method of claim 1, wherein the global operating strategy comprises at least one of (a) providing substantially constant power to a load, (b) providing substantially constant current to a load, and (c) providing substantially constant voltage to a load.

3. The method of claim 1, wherein the global operating strategy comprises operating the battery in a standby mode.

4. The method of claim 1, wherein the global operating strategy comprises receiving at least one of (a) a substantially constant power from an electric power source for charging the electrochemical cells of the plurality of stacks, (b) a substantially constant voltage from an electric power source for charging the electrochemical cells of the plurality of stacks, and (c) a substantially constant current from an electric power source for charging the electrochemical cells of the plurality of stacks.

5. The method of claim 1, further comprising executing the local operating strategy as part of a diagnostic test for one or more of the plurality of stacks.

6. The method of claim 1, wherein the local operating strategy comprises operating the one or more first stacks in at least one of (a) a constant power mode, (b) a constant current mode, (c) a constant voltage mode, and (d) an open circuit mode.

7. The method of claim 1, wherein the local operating strategy comprises operating the one or more first stacks at a different power level, or at a different current level, than the one or more second stacks.

8. The method of claim 1, wherein the local operating strategy comprises repeatedly changing respective operating points of the one or more first stacks.

9. The method of claim 1, wherein the local operating strategy comprises causing the one or more first stacks to move toward a different state of charge than the one or more second stacks.

10. A method for managing a plurality of stacks of electrochemical cells, the plurality of stacks being electrically coupled in parallel in a battery, the method comprising:

operating the plurality of stacks to execute a global operating strategy of the battery, the global operating strategy including a plurality of components;

changing respective operating points of one or more first stacks of the plurality of stacks to execute a local operating strategy; and changing respective operating points of one or more second stacks of the plurality of stacks to maintain the global operating strategy of the battery while executing the local operating strategy.

11. The method of claim 10, wherein the plurality of components of the global operating strategy comprise:

a first component selected from the group consisting of (a) providing constant power from the battery to a load, (b) providing constant current from the battery to a load, (c) providing constant voltage from the battery to a load, (d) receiving constant power at the battery from an electric power source, (e) receiving constant voltage at the battery from an electric power source, (f) receiving constant current at the battery from an electric power source, (g) operating the battery in a standby mode where the battery neither provides power to a load nor receives power from an electric power source, (h) stabilizing voltage of an alternating current (AC) electric power grid, and (i) stabilizing frequency of an AC electric power grid; and a second component selected from the group consisting of (a) maintaining a constant overall rate of charge of the battery, (b) maintaining a constant overall rate of discharge of the battery, (c) maintaining the plurality of stacks at a common state of charge as the stacks charge, and (d) maintaining the plurality of stacks at a common state of charge as the stacks discharge.

12. The method of claim 10, further comprising executing the local operating strategy to cause each stack of the plurality of stacks to reach a predetermined minimum state of charge, or a predetermined minimum voltage, at a substantially common time.

13. The method of claim 10, further comprising executing the local operating strategy to cause each stack of the plurality of stacks to reach a predetermined maximum state of charge, or a predetermined maximum voltage, at a substantially common time.

14. The method of claim 10, further comprising executing the local operating strategy as part of a diagnostic test for one or more of the plurality of stacks.

15. The method of claim 10, wherein the local operating strategy comprises operating the one or more first stacks at a different power level, or at a different current level, than the one or more second stacks.

16. The method of claim 10, wherein the local operating strategy comprises repeatedly changing respective operating points of the one or more first stacks.

17. The method of claim 10, wherein the local operating strategy comprises causing the one or more first stacks to move toward a different state of charge than the one or more second stacks.

18. A method for managing a plurality of stacks of electrochemical cells, the plurality of stacks being electrically coupled in parallel in a battery, the method comprising:

operating the plurality of stacks to execute a global operating strategy of the battery;

changing respective operating points of one or more first stacks of the plurality of stacks to execute a local operating strategy with respect to one or more second stacks of the plurality of stacks; and changing respective operating points of one or more third stacks of the plurality of stacks to maintain the global operating strategy of the battery while executing the local operating strategy.

19. The method of claim 18, further comprising executing the local operating strategy to cause each stack of the plurality of stacks to reach a predetermined minimum state of charge, or a predetermined minimum voltage, at a substantially common time.

20. The method of claim 18, further comprising executing the local operating strategy to cause each stack of the plurality of stacks to reach a predetermined maximum state of charge, or a predetermined maximum voltage, at a substantially common time.

\* \* \* \* \*